(12) United States Patent
Huang et al.

(10) Patent No.: US 10,979,933 B2
(45) Date of Patent: Apr. 13, 2021

(54) METHOD, NETWORK DEVICE, AND SYSTEM FOR IMPLEMENTING DATA PROCESSING, AND STORAGE MEDIUM

(71) Applicant: ZTE CORPORATION, Guangdong (CN)

(72) Inventors: He Huang, Shenzhen (CN); Jianmin Fang, Shenzhen (CN); Xiaojuan Shi, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 4 days.

(21) Appl. No.: 16/522,471

(22) Filed: Jul. 25, 2019

(65) Prior Publication Data
US 2020/0015116 A1    Jan. 9, 2020

Related U.S. Application Data

(63) Continuation of application No. PCT/CN2017/118890, filed on Dec. 27, 2017.

(30) Foreign Application Priority Data

Jan. 26, 2017    (CN) .......................... 201710061642.6

(51) Int. Cl.
*H04W 28/02*    (2009.01)
*H04W 76/12*    (2018.01)
(Continued)

(52) U.S. Cl.
CPC ....... *H04W 28/0268* (2013.01); *H04W 28/08* (2013.01); *H04W 28/12* (2013.01);
(Continued)

(58) Field of Classification Search
CPC . H04W 28/0268; H04W 76/12; H04W 28/08; H04W 28/12; H04W 36/08;
(Continued)

(56) References Cited

U.S. PATENT DOCUMENTS

2015/0365963 A1* 12/2015 Won .................. H04L 12/189
                                                                370/329
2016/0249259 A1    8/2016 Park et al.
(Continued)

FOREIGN PATENT DOCUMENTS

CN    104301955 A    1/2015
CN    104349505 A    2/2015
(Continued)

OTHER PUBLICATIONS

Extended European Search Report on EP 17894533.3 dated Mar. 18, 2020 (11 pages).
(Continued)

*Primary Examiner* — Ajit Patel
*Assistant Examiner* — Wilfred Thomas
(74) *Attorney, Agent, or Firm* — Foley & Lardner LLP

(57) ABSTRACT

Provided is a method, network device and system for implementing data processing. The method includes: transmitting, by a first network device, a request message to a second network device; feeding, by the second network device, a response message back to the first network device according to the request message received from the first network device; receiving, by the first network device, the response message fed back by the second network device, and transmitting an indication message to a third network device; and receiving, by the third network device, the indication message transmitted by the first network device, and processing data according to the indication message. The embodiments of the present application implement data splitting and handover processing for a next-generation mobile communication technology.

6 Claims, 19 Drawing Sheets

(51) Int. Cl.
*H04W 28/08* (2009.01)
*H04W 28/12* (2009.01)
*H04W 36/08* (2009.01)
*H04W 36/22* (2009.01)
*H04W 80/10* (2009.01)
*H04W 92/20* (2009.01)
*H04W 76/15* (2018.01)
*H04W 28/10* (2009.01)
*H04W 36/00* (2009.01)

(52) U.S. Cl.
CPC ........... *H04W 36/08* (2013.01); *H04W 36/22* (2013.01); *H04W 76/12* (2018.02); *H04W 80/10* (2013.01); *H04W 92/20* (2013.01)

(58) Field of Classification Search
CPC ..... H04W 36/22; H04W 80/10; H04W 92/20; H04W 76/15; H04W 28/02; H04W 28/10; H04W 36/00; H04W 28/0215; H04W 36/0016
See application file for complete search history.

(56) References Cited

U.S. PATENT DOCUMENTS

| | | | | |
|---|---|---|---|---|
| 2016/0295473 | A1* | 10/2016 | Lee | H04W 36/0022 |
| 2017/0013508 | A1* | 1/2017 | Pallas | H04W 76/12 |
| 2017/0231019 | A1* | 8/2017 | Xu | H04J 11/00 |
| 2018/0007591 | A1* | 1/2018 | Xu | H04W 36/0055 |
| 2018/0310353 | A1* | 10/2018 | Bangalore Satyanarayana | H04W 76/15 |
| 2019/0327642 | A1* | 10/2019 | Peng | H04W 28/0236 |
| 2020/0015116 | A1* | 1/2020 | Huang | H04W 28/02 |
| 2020/0205003 | A1* | 6/2020 | Ingale | H04W 12/106 |
| 2020/0260325 | A1* | 8/2020 | Futaki | H04W 76/22 |

FOREIGN PATENT DOCUMENTS

| | | |
|---|---|---|
| CN | 104812088 A | 7/2015 |
| CN | 105873133 A | 8/2016 |

OTHER PUBLICATIONS

International Search Report and Written Opinion for International Appl. No. PCT/CN2017/118890, dated Mar. 23, 2018.
3GPP.; "Evolved Universal Terrestrial Radio Access (E-UTRA) and Evolved Universal Terrestrial Radio Access Network (E-UTRAN)" Technical Specification Group Radio Access Network; Overall description; Stage 2 (Release 14), 3GPP TS 36.300 V14.1.0, Internet <URL: http://www.3gpp.org/ftp/Specs/archive/36_series/36.300/363 00-e10.zip>, Dec. 10, 2016, pp. 19-20, 41, 50, 89, 102-103, 146-147, 189, 222 (14 pages).
First Office Action for JP Appl. No. 2019-540653 dated Sep. 17, 2020 (with English translation, 14 pages).
Samsung: "DC procedure for Tight interworking option 4 and option 7" [online], 3GPP TSG RAN WG3; R3-170043, Internet <URL: ttp://www.3gpp.org/ftp/tsg_ran/WG3_lu/TSGR3_AHGs/R3_AH_NR_1701/Docs/R3-170043.zip>, Jan. 11, 2017, pp. 1-2 (7 pages).

* cited by examiner

METHOD, NETWORK DEVICE, AND SYSTEM FOR IMPLEMENTING DATA PROCESSING, AND STORAGE MEDIUM

CROSS-REFERENCE TO RELATED APPLICATIONS

This application claims the benefit of priority under 35 U.S.C. § 120 as a continuation of PCT Patent Application No. PCT/CN2017/118890 filed on Dec. 27, 2017, which claims priority to Chinese patent application No. 201710061642.6 filed on Jan. 26, 2017, the disclosure of each of which is incorporated herein by reference in its entirety.

TECHNICAL FIELD

The present disclosure relates to, but is not limited to, mobile communication technologies and, in particular, relates to a method, network device and system for implementing data processing, and a storage medium.

BACKGROUND

In a Long Term Evolution (LTE) mobile communication system, data flows with the same Quality of Service (QoS) requirements are aggregated into a bearer, and processing concerning the QoS by a Radio Access Network (RAN) and a Core Network (CN) is performed according to the bearer. FIG. 1 is a block diagram of the LTE mobile communication system in the related art. As shown in FIG. 1, in the LTE system, the RAN includes an evolved Node B (eNB) and a user equipment (UE). A network side bearer on a S1 interface between the eNB and a core network and a radio bearer on an air interface between the eNB and the UE are in a 1:1 relationship.

Currently, in the next generation mobile communication technologies under study, the 5th Generation mobile communication technology (5G) has a network throughput 1000 times that of the LTE system, a device connection number 100 times that of the LTE system, and a low-latency performance 10 times that of the LTE system. Therefore, the next generation system, including 5G, is required to have a new and better QoS mechanism.

The next generation system will adopt unified technology architecture to support services such as enhanced Mobile Broadband (eMBB), massive Machine Type Communication (mMTC) and Ultra Reliable and Low Latency Communication (URLLC). In the next generation mobile communication system, significant evolution has been made to the core network, the base station and the UE. FIG. 2 is a block diagram of a 5G mobile communication network. As shown in FIG. 2, a 5G base station is referred to as a gNB, an interface between gNBs is an Xn interface similar to the X2 interface between eNBs in a 4G system, and an interface between the gNB and the 5G core network is referred to as an NG interface. In the 5G system, multiple Protocol Data Unit sessions (PDU Sessions) may be established for one UE. One PDU Session may include multiple Quality of Service flows (QoS Flows), and multiple QoS flows of the same PDU Session may be mapped to the same Data Radio Bearer (DRB). The QoS flows of different PDU Sessions cannot be mapped to the same DRB. In the 5G base station, a new Access Stratum (AS) protocol layer (which is for example referred to as a Packet Data Association Protocol (PDAP)) is introduced above a Packet Data Convergence Protocol (PDCP) layer to coordinate new functions of a new QoS mechanism in the AS layer. Each PDU Session has one PDAP entity. The 5G base station may be divided into a Central Unit (CU) and a Distributed Unit (DU). One base station may include one CU and multiple DUs.

For the characteristics of the new QoS mechanism and the like in the next generation mobile system, no data processing method including data splitting and handover and the like in the system is provided at present.

SUMMARY

A summary of the subject matter is described hereinafter in detail. This summary is not intended to limit the scope of the claims.

Embodiments of the present application provide a method, a network device and a system for implementing data processing, and a storage medium, which may implement data splitting and handover processing on the next generation system.

An embodiment of the present application provides a method for implementing data processing. The method includes two steps described below.

A first network device transmits a request message to a second network device.

The first network device receives a response message fed back by the second network device.

The request message includes at least one piece of first protocol data unit (PDU) session information, and the response message includes at least one piece of second PDU session information indicating acceptance to the second network device.

Optionally, the first PDU session information includes at least one of: a PDU session identifier, next generation (NG) interface uplink tunnel endpoint information, or at least one piece of Quality of Service (QoS) flow information.

Optionally, the request message further includes at least one of: at least one piece of data radio bearer (DRB) information, or data forwarding mode indication information.

Optionally, when the first PDU session information includes the QoS flow information, the QoS flow information includes at least one of: a QoS flow identifier, or QoS profile information.

Optionally, when the request message includes the at least one piece of DRB information, each of the at least one piece of DRB information includes at least one of: a DRB identifier, DRB configuration information, or at least one QoS flow identifier mapped to a DRB.

Optionally, when the response message includes at least one piece of Xn interface data forwarding tunnel endpoint information, the method further includes a step described below.

The first network device forwards data to the second network device according to the at least one piece of Xn interface data forwarding tunnel endpoint information.

The forwarded data includes an end marker including a QoS flow identifier.

Optionally, the method further includes a step described below.

The first network device adds, through a packet data association protocol (PDAP) entity of the first network device, the DRB identifier into each data packet forwarded by an Xn interface, to enable a PDAP entity of the second network device to match the each data packet with a DRB associated with the each data packet according to the DRB identifier.

Optionally, the QoS profile information includes at least one of: a QoS Marking, a reflective indication, a priority level, a packet delay budget, a packet error rate, an uplink (UL) and downlink (DL) maximum flow bit rate, a UL and DL guaranteed flow bit rate, an allocation and retention priority (ARP), or notification control.

Optionally, data forwarding includes at least one of: forwarding based the PDU session, forwarding based on a QoS flow, or forwarding based on a DRB.

Optionally, when the first network device is a primary base station and the second network device is a secondary base station, the request message is a splitting request message, and the response message is a splitting response message.

Optionally, the method further includes a step described below.

The first network device transmits an indication message to a third network device according to the received response message.

The third network device is a core network.

Optionally, the indication message includes at least one piece of third PDU session information indicating requirement for splitting.

Optionally, each of the at least one piece of third PDU session information includes at least one of: a PDU session identifier, at least one piece of NG interface downlink tunnel endpoint information, or at least one QoS flow identifier.

Optionally, the request message further includes at least one of: at least one QoS flow identifier corresponding to each of at least one piece of NG interface downlink tunnel endpoint information, or a splitting mode indication.

Optionally, the method further includes a step described below.

The first network device transmits a change message to the second network device.

The change message includes at least one piece of fourth PDU session information indicating cancelation of splitting.

Optionally, each of the at least one piece of fourth PDU session information includes at least one of: a PDU session identifier, or at least one QoS flow identifier.

Optionally, the change message further includes information to be changed.

The information to be changed includes at least one of: at least one QoS flow identifier, a PDU session identifier corresponding to each QoS flow, or QoS profile information of each QoS flow after being changed.

Optionally, when the first network device is a source base station and the second network device is a target base station, the request message is a handover request message, and the response message is a handover response message.

Optionally, the method further includes a step described below.

The first network device transmits a handover command to a user equipment (UE) according to the received response message.

Optionally, the method further includes a step described below.

The first network device transmits a reconfiguration message to the UE.

Optionally, the splitting includes: splitting based on the PDU session and splitting based on a QoS flow.

Optionally, the splitting request message includes one of: a second network device addition message initiated by the first network device, a second network device change message, or a first predefined message.

Optionally, the indication message includes one of: a response message to a PDU session establishment message initiated by the third network device, a PDU session change indication message initiated by the first network device, or a second predefined message.

Optionally, the change information includes one of: a second network device change message initiated by the first network device, or a third predefined message.

In another aspect, an embodiment of the present application further provides a method for implementing data processing. The method includes two steps described below.

A second network device receives a request message transmitted by a first network device.

The second network device feeds a response message back to the first network device according to the request message received from the first network device.

The request message includes at least one piece of first PDU session information.

The response message includes at least one piece of second PDU session information indicating acceptance to the second network device.

In another aspect, an embodiment of the present application further provides a method for implementing data processing. The method includes two steps described below. A third network device receives an indication message transmitted by a first network device.

The third network device transmits an acknowledgement message after receiving the indication message.

The acknowledgement message includes at least one piece of sixth PDU session information indicating acceptance of splitting.

In another aspect, an embodiment of the present application further provides a network device. The network device includes a first transmitting unit and a first receiving unit.

The first transmitting unit is configured to transmit a request message to a second network device.

The first receiving unit is configured to receive a response message fed back by the second network device.

The request message includes at least one piece of first PDU session information, and the response message includes at least one piece of second PDU session information indicating acceptance to the second network device.

In another aspect, an embodiment of the present application further provides a network device. The network device includes a second receiving unit and a second transmitting unit.

The second receiving unit is configured to receive a request message transmitted by a first network device.

The second transmitting unit is configured to feed a response message back to the first network device according to the request message received from the first network device.

The request message includes at least one piece of first PDU session information.

The response message includes at least one piece of second PDU session information indicating acceptance to the second network device.

In another aspect, an embodiment of the present application further provides a network device. The network device includes a third receiving unit and a third transmitting unit.

The third receiving unit is configured to receive an indication message transmitted by a first network device.

The third transmitting unit is configured to transmit an acknowledgement message to the first network device after receiving the indication message.

The acknowledgement message includes at least one piece of sixth PDU session information indicating acceptance of splitting.

In another aspect, an embodiment of the present application further provides a method for implementing data processing. The method includes four steps described below.

A first network device transmits a request message to a second network device.

The second network device feeds a response message back to the first network device according to the request message received from the first network device.

The first network device receives the response message fed back by the second network device, and transmits an indication message to a third network device.

The third network device receives the indication message transmitted by the first network device to perform data processing according to the indication message.

The request message includes at least one piece of first PDU session information, and the response message includes at least one piece of second PDU session information indicating acceptance to the second network device.

In another aspect, an embodiment of the present application further provides a system. The system includes a first network device, a second network device and a third network device.

The first network device is configured to transmit a request message to the second network device, receive a response message fed back by the second network device, and transmit an indication message to the third network device.

The second network device is configured to feed the response message back to the first network device according to the request message received from the first network device.

The third network device is configured to receive the indication message transmitted by the first network device to perform data processing according to the indication message.

The request message includes at least one piece of first PDU session information, and the response message includes at least one piece of second PDU session information indicating acceptance to the second network device.

Compared with the related art, the technical solution of the present application includes that a first network device transmits a request message to a second network device; the second network device feeds a response message back to the first network device according to the request message received from the first network device; the first network device receives the response message fed back by the second network device, and transmits an indication message to a third network device; and the third network device receives the indication message transmitted by the first network device, and processing data according to the indication message. The embodiments of the present application implement data splitting and handover processing for a next-generation mobile communication technology.

Other features and advantages of the present application will be elaborated hereinafter in the description and, moreover, partially become apparent from the description, or will be understood through implementation of the present application. The object and other advantages of the present application may be implemented and obtained through structures set forth in the description, claims and drawings.

BRIEF DESCRIPTION OF DRAWINGS

The drawings are provided for a further understanding of the technical solutions of the present application, and constitute a part of the description. The drawings and the embodiments of the present application are used to explain the technical solutions of the present application, and not intended to limit the technical solutions of the present application.

DETAILED DESCRIPTION

Objects, technical solutions and advantages of the present application will be clearer from a detailed description of embodiments of the present application in conjunction with the drawings. It is to be noted that if not in collision, the embodiments and features therein in the present application may be combined with each other.

The steps shown in the flowcharts of the drawings may be performed by a computer system such as a group of computers capable of executing instructions. Although logical sequences are shown in the flowcharts, the shown or described steps may be performed in sequences different from those described herein in some cases.

Figure 1:
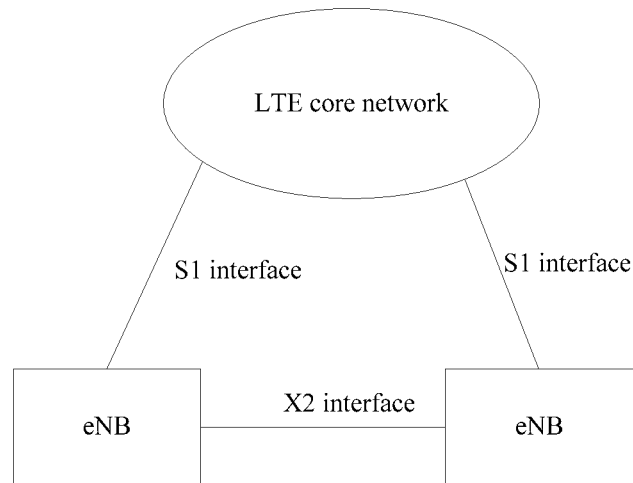
FIG. 1 is a block diagram of an LTE mobile communication system in the related art.
Figure 2:
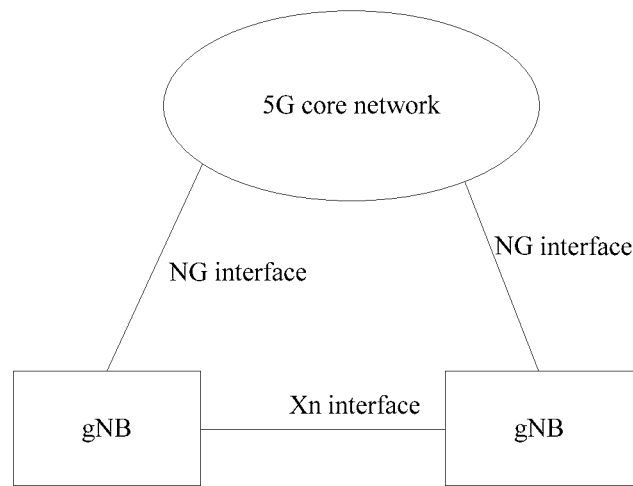
FIG. 2 is a structural diagram of a 5G mobile communication network.
Figure 3:
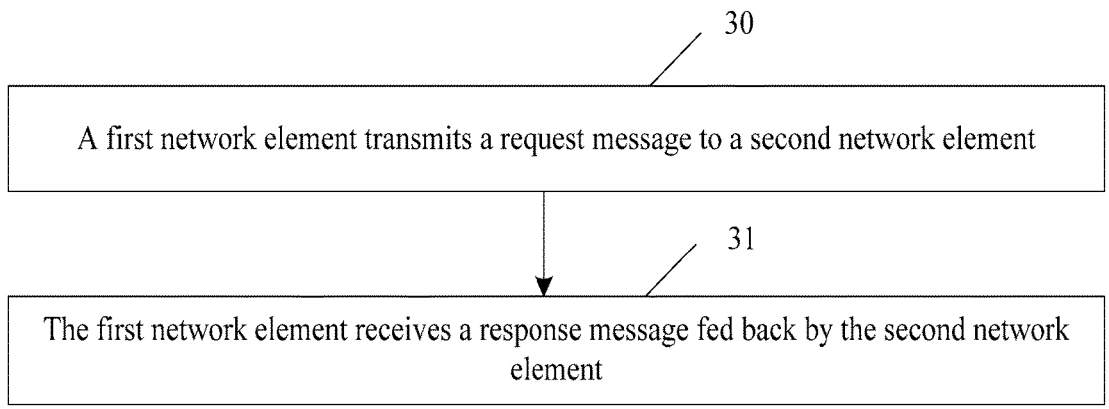
FIG. 3 is a flowchart of a method for implementing data processing according to an embodiment of the present application.

FIG. 3 is a flowchart of a method for implementing data processing according to an embodiment of the present application. As shown in FIG. 3, the method includes steps 30 and 31 described below.

In step 30, a first network device transmits a request message to a second network device.

The request message includes at least one piece of first protocol data unit (PDU) session information.

Optionally, in the embodiment, the first PDU session information includes at least one of: a PDU session identifier, next generation (NG) interface uplink tunnel endpoint information, or at least one piece of Quality of Service (QoS) flow information.

Optionally, in the embodiment, the request message further includes at least one of: at least one piece of data radio bearer (DRB) information, or data forwarding mode indication information.

Optionally, in the embodiment, when the first PDU session information includes the QoS flow information, the QoS flow information includes at least one of: a QoS flow identifier, or QoS profile information.

Optionally, in the embodiment, when the request message includes the at least one piece of DRB information, each of the at least one piece of DRB information includes at least one of: a DRB identifier, DRB configuration information, or at least one QoS flow identifier mapped to a DRB.

In step 31, the first network device receives a response message fed back by the second network device.

The response message includes at least one piece of second PDU session information indicating acceptance to the second network device.

Optionally, in the embodiment, when the response message includes at least one piece of Xn interface data forwarding tunnel endpoint information, the method further includes a step described below.

The first network device forwards data to the second network device according to the at least one piece of Xn interface data forwarding tunnel endpoint information in the response message.

The forwarded data includes an end marker including a QoS flow identifier.

Optionally, the method further includes a step described below.

The first network device adds, through a packet data association protocol (PDAP) entity of the first network device, the DRB identifier into each data packet forwarded by an Xn interface, to enable a PDAP entity of the second network device to match the each data packet with a DRB associated with the each data packet according to the DRB identifier.

Optionally, in the embodiment, the QoS profile information includes at least one of:

a QoS marking, a reflective indication, a priority level, a packet delay budget, a packet error rate, an uplink (UL) and downlink (DL) maximum flow bit rate, a UL and DL guaranteed flow bit rate, an allocation and retention priority (ARP), or notification control.

Optionally, in the embodiment, data forwarding includes at least one of: forwarding based the PDU session, forwarding based on a QoS flow, or forwarding based on a DRB.

In the embodiment, when the first network device is a primary base station and the second network device is a secondary base station, the request message is a splitting request message, and the response message is a splitting response message.

Optionally, in the embodiment, the method further includes a step described below.

The first network device transmits an indication message to a third network device according to the received response message.

The third network device is a core network.

Optionally, in the embodiment, the indication message includes at least one piece of third PDU session information indicating requirement for splitting.

Optionally, in the embodiment, each of the at least one piece of third PDU session information includes at least one of: a PDU session identifier, at least one piece of NG interface downlink tunnel endpoint information, or at least one QoS flow identifier.

Optionally, in the embodiment, the indication message further includes at least one of: at least one QoS flow identifier corresponding to each of at least one piece of NG interface downlink tunnel endpoint information, or a splitting mode indication.

Optionally, in the embodiment, the method further includes a step described below.

The first network device transmits a change message to the second network device.

The change message includes at least one piece of fourth PDU session information indicating cancelation of splitting.

Optionally, in the embodiment, each of the at least one piece of fourth PDU session information includes at least one of: a PDU session identifier, or at least one QoS flow identifier.

Optionally, in the embodiment, the change message further includes information to be changed.

The information to be changed includes at least one of: at least one QoS flow identifier, a PDU session identifier corresponding to each QoS flow, or QoS profile information of each QoS flow after being changed.

Optionally, in the embodiment, when the first network device is a source base station and the second network device is a target base station, the request message is a handover request message, and the response message is a handover response message.

Optionally, in the embodiment, the method further includes a step described below.

The first network device transmits a handover command to a user equipment (UE) according to the received response message.

Optionally, in the embodiment, the method further includes a step described below.

The first network device transmits a reconfiguration message to the UE.

Optionally, in the embodiment, the splitting includes: splitting based on the PDU session and splitting based on a QoS flow.

Optionally, in the embodiment, the splitting request message includes one of: a second network device addition message initiated by the first network device, a second network device change message, or a first predefined message.

Optionally, in the embodiment, the indication message includes one of: a response message to a PDU session establishment message initiated by the third network device, a PDU session change indication message initiated by the first network device, or a second predefined message.

Optionally, in the embodiment, the change message includes one of: a second network device change message initiated by the first network device, or a third predefined message.

The embodiment implements data splitting and handover processing for a next-generation mobile communication technology.

The embodiment further provides a computer storage medium, which is configured to store computer-executable instructions for executing the method for implementing data processing described above.

Figure 4:
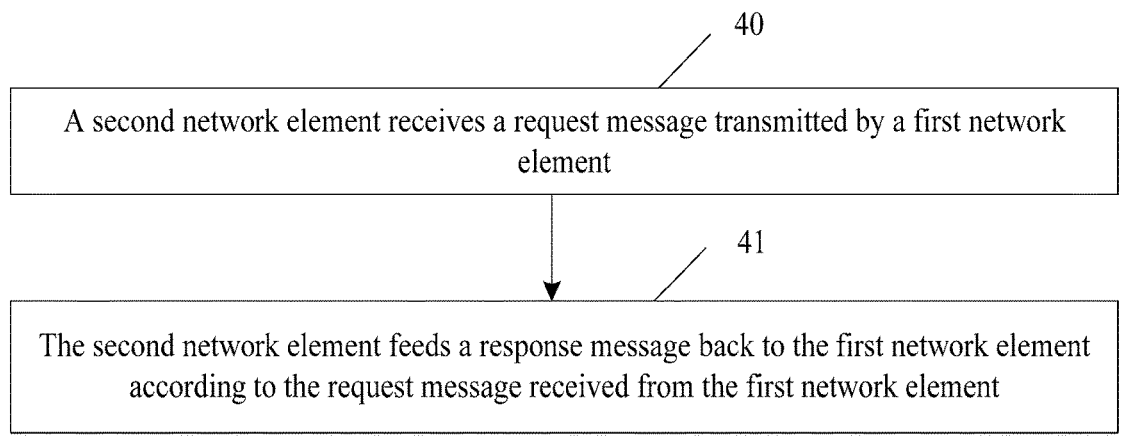
FIG. 4 is a flowchart of a method for implementing data processing according to another embodiment of the present application.

FIG. 4 is a flowchart of a method for implementing data processing according to another embodiment of the present application. As shown in FIG. 4, the method includes steps 40 and 41 described below.

In step 40, a second network device receives a request message transmitted by a first network device.

The request message includes at least one piece of first PDU session information.

In step 41, the second network device feeds a response message back to the first network device according to the request message received from the first network device.

The response message includes at least one piece of second PDU session information indicating acceptance to the second network device.

Optionally, in the embodiment, when the first network device is a primary base station and the second network device is a secondary base station, the request message is a splitting request message, and the response message is a splitting response message.

Optionally, in the embodiment, when the first network device is a source base station and the second network device is a target base station, the request message is a handover request message, and the response message is a handover response message.

Optionally, in the embodiment, the method further includes a step described below.

The second network device transmits a path switch request message to a third network device after access of a UE.

Optionally, in the embodiment, the at least one piece of second PDU session information indicating acceptance to the second network device in the response message includes at least one of: a PDU session identifier, at least one piece of NG interface downlink tunnel endpoint information, at least one piece of Xn interface data forwarding tunnel endpoint information, a DRB identifier corresponding to at least one Xn interface data forwarding tunnel endpoint, a QoS flow identifier or a QoS flow identifier list corresponding to at least one Xn interface data forwarding tunnel endpoint, or at least one QoS flow identifier.

Optionally, in the embodiment, the at least one piece of second PDU session information indicating acceptance to the second network device includes at least one of: a PDU session identifier, at least one piece of Xn interface data forwarding tunnel endpoint information, a DRB identifier corresponding to at least one Xn interface data forwarding tunnel endpoint, a QoS flow identifier or a QoS flow identifier list corresponding to at least one Xn interface data forwarding tunnel endpoint, or at least one QoS flow identifier.

Optionally, in the embodiment, the response message further includes: at least one piece of fifth PDU session information indicating rejection of acceptance.

Each of the at least one piece of fifth PDU session information indicating rejection of acceptance includes at least one of: a PDU session identifier, or at least one QoS flow identifier.

Optionally, when the request message includes a forwarding mode indication, the method further includes a step described below.

The second network device determines an Xn interface data forwarding mode according to the forwarding mode indication.

Optionally, in the embodiment, the method further includes a step described below.

The second network device determines, through a PDAP entity of the second network device, that forwarding of a QoS flow completes according to a QoS flow identifier in an end marker received from an Xn interface.

The embodiment implements data splitting and handover processing for a next-generation mobile communication technology.

The embodiment further provides a computer storage medium, which is configured to store computer-executable instructions for executing the method for implementing data processing described above.

Figure 5:
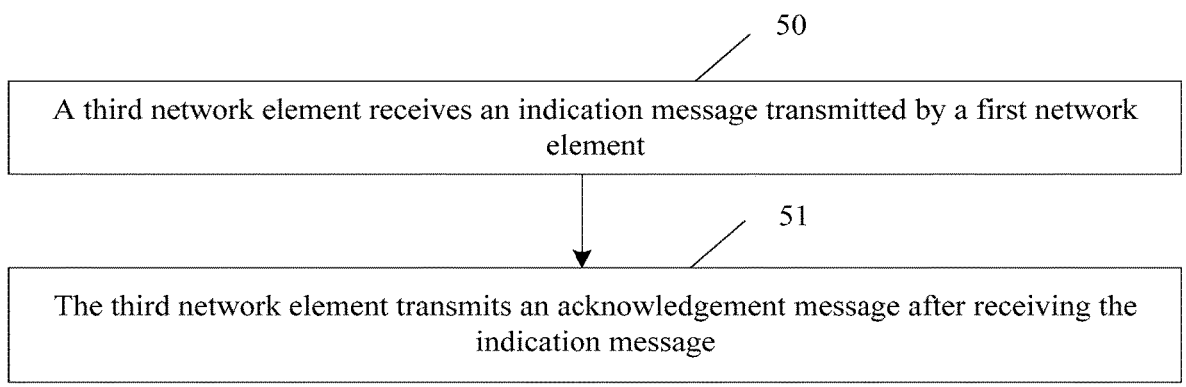
FIG. 5 is a flowchart of a method for implementing data processing according to yet another embodiment of the present application.

FIG. 5 is a flowchart of a method for implementing data processing according to yet another embodiment of the present application. As shown in FIG. 5, the method includes steps 50 and 51 described below.

In step 50, a third network device receives an indication message transmitted by a first network device.

In step 51, the third network device transmits an acknowledgement message after receiving the indication message.

The acknowledgement message includes at least one piece of sixth PDU session information indicating acceptance of splitting.

Optionally, in the embodiment, each of the at least one piece of sixth PDU session information includes at least one of: a PDU session identifier, or at least one QoS flow identifier.

Optionally, in the embodiment, the acknowledgement message further includes: at least one piece of seventh PDU session information indicating rejection of splitting.

Each of the at least one piece of seventh PDU session information includes one of: a PDU session identifier, or at least one QoS flow identifier.

Optionally, in the embodiment, the acknowledgement message further includes information to be changed.

The information to be changed includes at least one of: at least one QoS flow identifier, a PDU session identifier corresponding to each QoS flow, or QoS profile information of each QoS flow after being changed.

Optionally, in the embodiment, the method further includes two steps described below.

The third network device receives a path switch request transmitted by a second network device.

The third network device performs a path switch from the first network device to the second network device according to the received path switch request.

Optionally, in the embodiment, the method further includes a step described below.

The third network device transmits an end marker including a QoS flow identifier to the first network device after transmitting a last data packet of each QoS flow to the first network device.

Optionally, in the embodiment, the method further includes a step described below.

The third network device transmits a path switch acknowledgement message to the second network device.

The embodiment implements data splitting and handover processing for a next-generation mobile communication technology.

The embodiment further provides a computer storage medium, which is configured to store computer-executable instructions for executing the method for implementing data processing described above.

Figure 6:
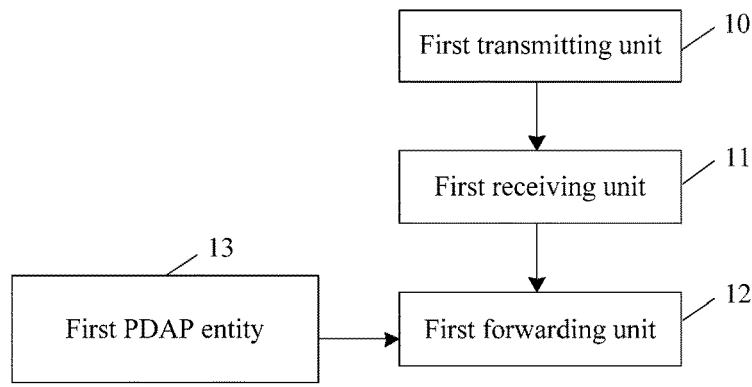
FIG. 6 is a structural diagram of a network device according to an embodiment of the present application.

FIG. 6 is a structural diagram of a network device according to an embodiment of the present application. As shown in FIG. 6, the network device includes a first transmitting unit (or first transmitter) 10 and a first receiving unit (first receiver) 11.

The first transmitting unit 10 is configured to transmit a request message to a second network device. The request message includes at least one piece of first PDU session information.

Optionally, the first PDU session information includes at least one of: a PDU session identifier, NG interface uplink tunnel endpoint information, or at least one piece of QoS flow information.

Optionally, the request message further includes at least one of: at least one piece of DRB information, or data forwarding mode indication information.

Optionally, in the embodiment, when the first PDU session information includes the QoS flow information, the QoS flow information includes at least one of: a QoS flow identifier, or QoS profile information.

Optionally, when the request message includes the at least one piece of DRB information, each of the at least one piece of DRB information includes at least one of: a DRB identifier, DRB configuration information, or at least one QoS flow identifier mapped to a DRB.

The first receiving unit 11 is configured to receive a response message fed back by the second network device.

The response message includes at least one piece of second PDU session information indicating acceptance.

Optionally, in the embodiment, the network device further includes a first forwarding unit 12.

The first forwarding unit 12 is configured to forward data to the second network device according to at least one piece of Xn interface data forwarding tunnel endpoint information in the response message.

The forwarded data includes an end marker including a QoS flow identifier.

Optionally, in the embodiment, the network device further includes a first PDAP entity 13.

The first PDAP entity 13 is configured to add the DRB identifier into each data packet forwarded by an Xn interface, to enable a PDAP entity of the second network device to match the each data packet with a DRB associated with the each data packet according to the DRB identifier.

Optionally, in the embodiment, the QoS profile information includes at least one of: a QoS marking, a reflective indication, a priority level, a packet delay budget, a packet error rate, a UL and DL maximum flow bit rate, a UL and DL guaranteed flow bit rate, an ARP, or notification control.

Optionally, in the embodiment, data forwarding includes at least one of: forwarding based the PDU session, forwarding based on a QoS flow, or forwarding based on a DRB.

Optionally, in the embodiment, when the network device is a primary base station and the second network device is a secondary base station, the request message is a splitting request message, and the response message is a splitting response message.

Optionally, the first transmitting unit 10 is further configured to transmit an indication message to a third network device according to the received response message.

The third network device is a core network.

Optionally, the indication message includes at least one piece of third PDU session information indicating requirement for splitting.

Optionally, in the embodiment, each of the at least one piece of third PDU session information includes at least one of: a PDU session identifier, at least one piece of NG interface downlink tunnel endpoint information, or at least one QoS flow identifier.

Optionally, the indication message further includes at least one of: at least one QoS flow identifier corresponding to each of at least one piece of NG interface downlink tunnel endpoint information, or a splitting mode indication.

Optionally, the first transmitting unit 10 is further configured to transmit a change message to the second network device.

The change message includes at least one piece of fourth PDU session information indicating cancelation of splitting.

Optionally, in the embodiment, each of the at least one piece of fourth PDU session information includes at least one of: a PDU session identifier, or at least one QoS flow identifier.

Optionally, the change message further includes information to be changed.

The information to be changed includes at least one of: at least one QoS flow identifier, a PDU session identifier corresponding to each QoS flow, or QoS profile information of each QoS flow after being changed.

Optionally, when the network device is a source base station and the second network device is a target base station, the request message is a handover request message, and the response message is a handover response message.

Optionally, the first transmitting unit 10 is further configured to transmit a handover command to a UE according to the received response message.

Optionally, the first transmitting unit 10 is further configured to transmit a reconfiguration message to the UE.

Optionally, in the embodiment, the splitting includes: splitting based on the PDU session and splitting based on a QoS flow.

Optionally, in the embodiment, the splitting request message includes one of: a second network device addition message initiated by the network device, a second network device change message, or a first predefined message.

Optionally, in the embodiment, the indication message includes one of: a response message to a PDU session establishment message initiated by the third network device, a PDU session change indication message initiated by the network device, or a second predefined message.

Optionally, in the embodiment, the change message includes one of: a second network device change message initiated by first network device, or a third predefined message.

Figure 7:
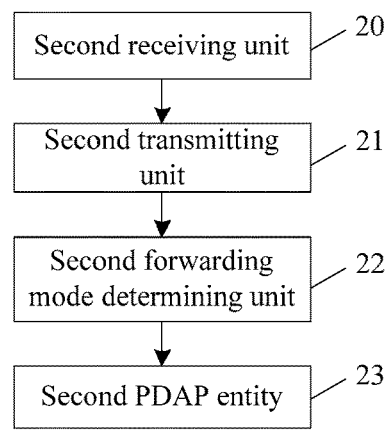
FIG. 7 is a structural diagram of a network device according to another embodiment of the present application.

FIG. 7 is a structural diagram of a network device according to another embodiment of the present application. As shown in FIG. 7, the network device includes a second receiving unit (or second receiver) 20 and a second transmitting unit (or second transmitter) 21.

The second receiving unit 20 is configured to receive a request message transmitted by a first network device.

The second transmitting unit 21 is configured to feed a response message back to the first network device according to the request message received from the first network device.

The request message includes at least one piece of first PDU session information.

The response message includes at least one piece of second PDU session information indicating acceptance to the second network device.

Optionally, in the embodiment, when the network device is a secondary base station and the first network device is a primary base station, the request message is a splitting request message, and the response message is a splitting response message.

Optionally, in the embodiment, when the network device is a target base station and the first network device is a source base station, the request message is a handover request message, and the response message is a handover response message.

Optionally, in the embodiment, the second transmitting unit 21 is further configured to transmit a path switch request message to a third network device after access of a UE.

Optionally, in the embodiment, the at least one piece of second PDU session information indicating acceptance to the second network device in the response message includes at least one of: a PDU session identifier, at least one piece of NG interface downlink tunnel endpoint information, at least one piece of Xn interface data forwarding tunnel endpoint information, a DRB identifier corresponding to at least one Xn interface data forwarding tunnel endpoint, a QoS flow identifier or a QoS flow identifier list corresponding to at least one Xn interface data forwarding tunnel endpoint, or at least one QoS flow identifier.

Optionally, in the embodiment, the at least one piece of second PDU session information indicating acceptance to the second network device includes at least one of: a PDU session identifier, at least one piece of Xn interface data forwarding tunnel endpoint information, a DRB identifier corresponding to at least one Xn interface data forwarding tunnel endpoint, a QoS flow identifier or a QoS flow identifier list corresponding to at least one Xn interface data forwarding tunnel endpoint, or at least one QoS flow identifier.

Optionally, in the embodiment, the response message further includes: at least one piece of fifth PDU session information indicating rejection of acceptance.

Each of the at least one piece of fifth PDU session information indicating rejection of acceptance includes at least one of: a PDU session identifier, or at least one QoS flow identifier.

Optionally, in the embodiment, the network device further includes a second forwarding mode determining unit 22, which is configured to, when the request message includes a forwarding mode indication, determine an Xn interface data forwarding mode according to the forwarding mode indication.

Optionally, in the embodiment, the network device further includes a second PDAP entity 23.

The second PDAP entity 23 is configured to determine that forwarding of a QoS flow completes according to a QoS flow identifier in an end marker received from an Xn interface.

Figure 8:
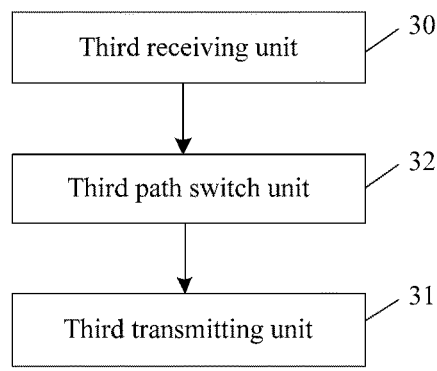
FIG. 8 is a structural diagram of a network device according to yet another embodiment of the present application.

FIG. 8 is a structural diagram of a network device according to yet another embodiment of the present application. As shown in FIG. 8, the network device includes a third receiving unit (or third receiver) 30 and a third transmitting unit (or third transmitter) 31.

The third receiving unit 30 is configured to receive an indication message transmitted by a first network device.

The third transmitting unit 31 is configured to transmit an acknowledgement message to the first network device after receiving the indication message.

The acknowledgement message includes at least one piece of sixth PDU session information indicating acceptance of splitting.

Optionally, in the embodiment, each of the at least one piece of sixth PDU session information includes at least one of: a PDU session identifier, or at least one QoS flow identifier.

Optionally, the acknowledgement message further includes: at least one piece of seventh PDU session information indicating rejection of splitting.

Each of the at least one piece of seventh PDU session information includes one of: a PDU session identifier, or at least one QoS flow identifier.

Optionally, the acknowledgement message further includes information to be changed.

The information to be changed includes at least one of: at least one QoS flow identifier, a PDU session identifier corresponding to each QoS flow, or QoS profile information of each QoS flow after being changed.

Optionally, the third receiving unit 30 is further configured to receive a path switch request transmitted by a second network device.

The network device further includes a third path switch unit 32.

The third path switch unit 32 is configured to perform a path switch from the first network device to the second network device according to the received path switch request.

Optionally, the third transmitting unit is further configured to transmit an end marker including a QoS flow identifier to the first network device after transmitting a last data packet of each QoS flow to the first network device.

Optionally, the third transmitting unit is further configured to transmit a path switch acknowledgement message to the second network device.

Figure 9:
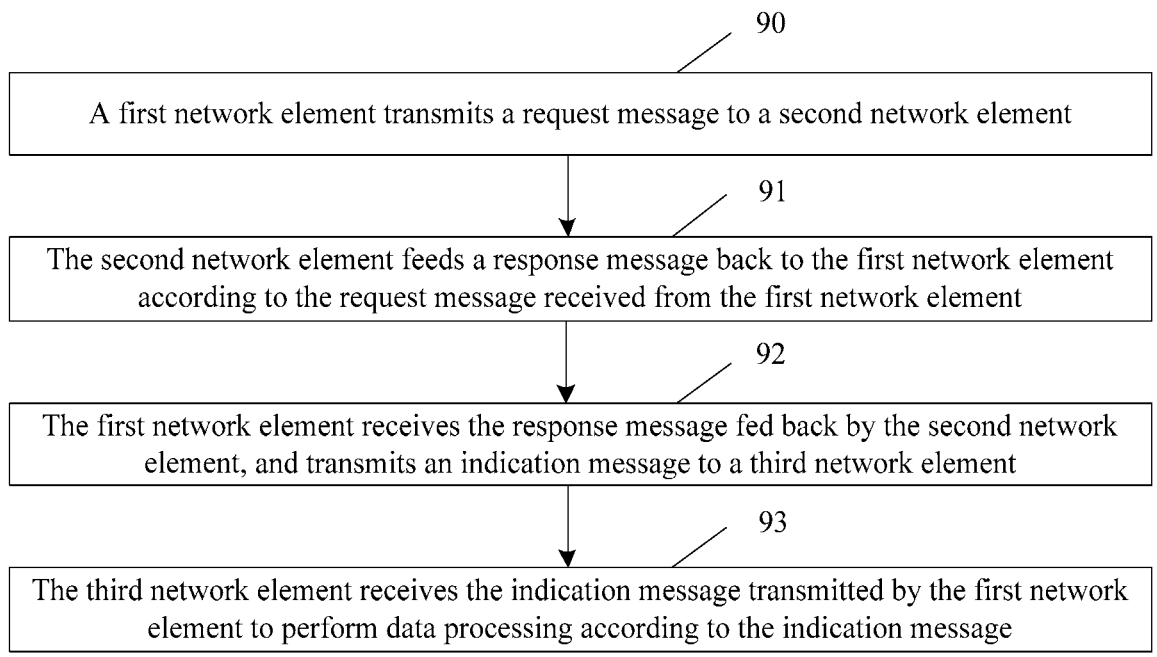
FIG. 9 is a flowchart of a method for implementing data processing according to yet another embodiment of the present application.

FIG. 9 is a flowchart of a method for implementing data processing according to yet another embodiment of the present application. As shown in FIG. 9, the method includes steps 90, 91, 92 and 93 described below.

In step 90, a first network device transmits a request message to a second network device.

In step 91, the second network device feeds a response message back to the first network device according to the request message received from the first network device.

In step 92, the first network device receives the response message fed back by the second network device, and transmits an indication message to a third network device.

In step 93, the third network device receives the indication message transmitted by the first network device to perform data processing according to the indication message.

The request message includes at least one piece of first PDU session information, and the response message includes at least one piece of second PDU session information indicating acceptance.

Optionally, when the first network device is a primary base station, the second network device is a secondary base station and the third network device is a core network, the request message is a splitting request message, and the response message is a splitting response message.

When the first network device is a source base station, the second network device is a target base station and the third network device is a core network, the request message is a handover request message, and the response message is a handover response message.

In another aspect, an embodiment of the present application further provides a system. The system includes a first network device, a second network device and a third network device.

The first network device is configured to transmit a request message to the second network device, receive a response message fed back by the second network device, and transmit an indication message to the third network device.

The second network device is configured to feed the response message back to the first network device according to the request message received from the first network device.

The third network device is configured to receive the indication message transmitted by the first network device to perform data processing according to the indication message.

The request message includes at least one piece of first PDU session information, and the response message includes at least one piece of second PDU session information indicating acceptance.

Optionally, when the first network device is a primary base station, the second network device is a secondary base station and the third network device is a core network, the request message is a splitting request message, and the response message is a splitting response message.

When the first network device is a source base station, the second network device is a target base station and the third network device is a core network, the request message is a handover request message, and the response message is a handover response message.

The methods of the present application will be described in detail below with reference to embodiments which are only intended to illustrate the present application and not to limit the scope of the present application. In the schematic diagrams of the network structure provided in the embodiments, in order to distinguish the PDU session from the DRB, the PDU session is represented by a right-angled rectangle, and the DRB is represented by a rounded rectangle. Each PDU session, DRB and QoS flow are all provided with a digital code. For example, the right-angled rectangle numbered 1 represents the PDU session 1. For PDU sessions, DRBs and QoS flows numbered the same number, they are distinguished by dotted and solid lines, representing PDU sessions, DRBs and QoS flows before splitting (or before handover) and after splitting (or after handover) respectively.

Embodiment 1

Figure 10:
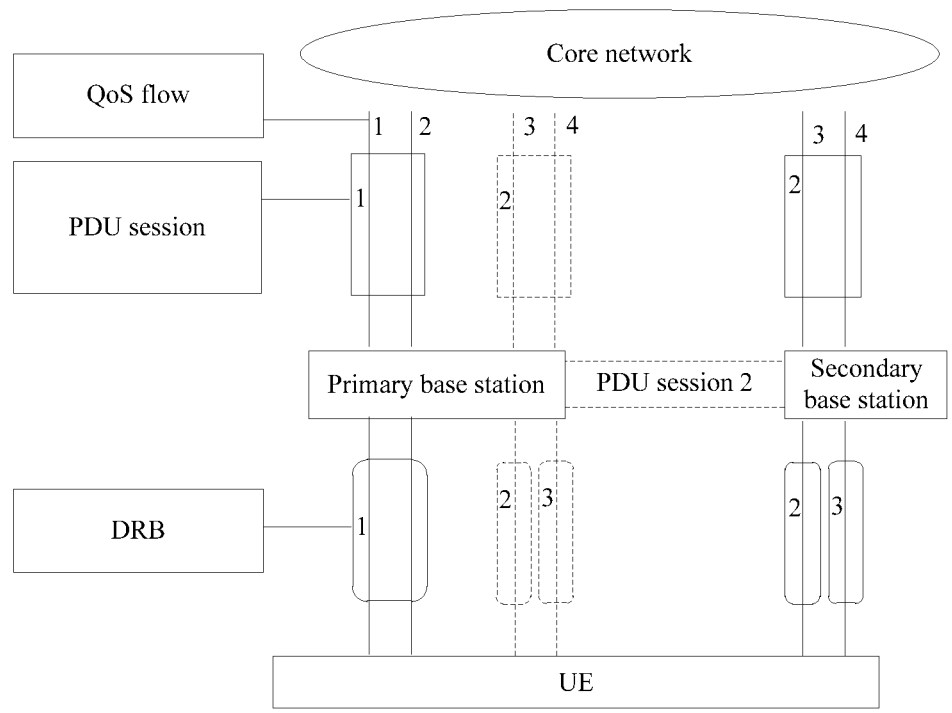
FIG. 10 is a schematic diagram of a network structure of Embodiment 1.

The embodiment is splitting and forwarding based on PDU session information. FIG. 10 is a schematic diagram of a network structure of Embodiment 1. As shown in FIG. 10, for a UE in the network, two PDU Sessions are established between a primary base station and a core network establish two PDU Sessions, and are assumed to be a PDU Session 1 and a PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to a DRB 1, the QoS flow 3 is mapped to a DRB 2, and the QoS flow 4 is mapped to a DRB 3. In the embodiment, the primary base station of the UE determines to split the PDU Session 2 to the secondary base station of the UE.

Figure 11:
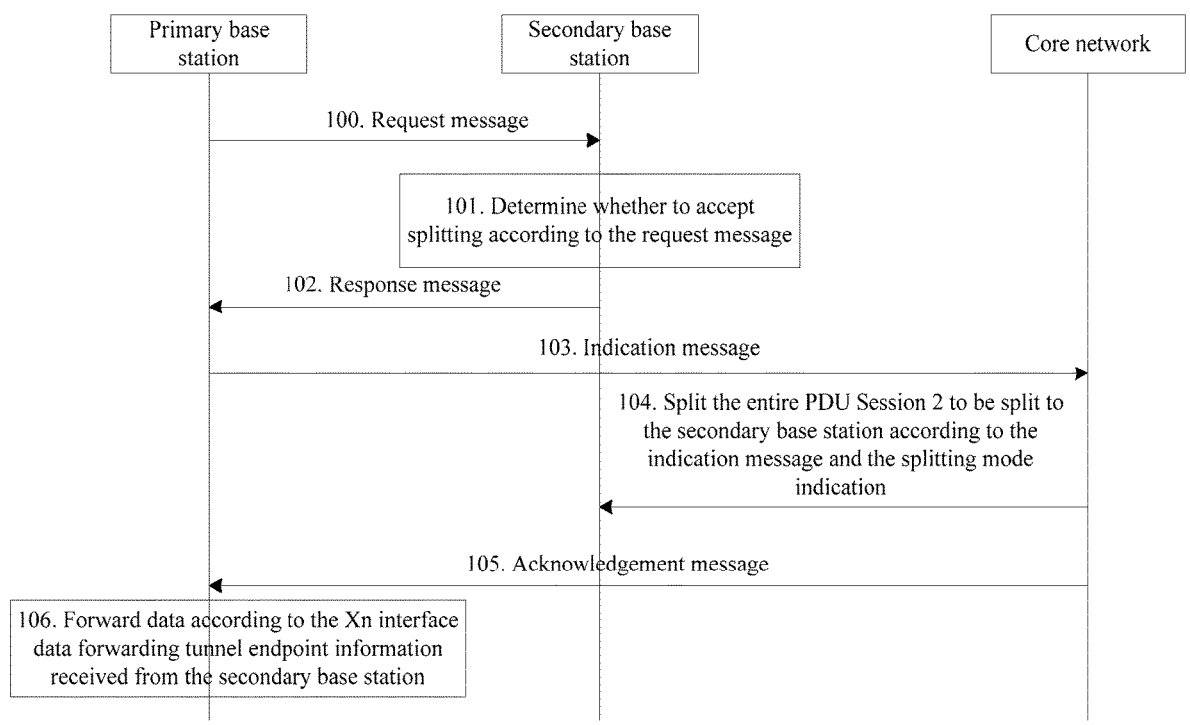
FIG. 11 is a method flowchart of Embodiment 1.

FIG. 11 is a method flowchart of Embodiment 1. As shown in FIG. 11, the method includes steps 100, 101, 102, 103, 104, 105 and 106 described below.

In step 100, the primary base station transmits a request message to a secondary base station. The request message carries information of the PDU Session 2 to be split. The PDU Session 2 information includes a PDU Session 2 identifier, NG interface uplink tunnel endpoint information of the PDU Session 2, an identifier of the QoS flow 3 in the PDU Session 2 and corresponding QoS profile information, and an identifier of the QoS flow 4 in the PDU Session 2 and corresponding QoS profile information. The request message also carries DRB 2 information and DRB 3 information. The DRB 2 information includes a DRB 2 identifier, corresponding DRB 2 configuration information, and the QoS flow 3 identifier mapped to the DRB 2. The DRB 3 information includes a DRB 3 identifier, corresponding DRB 3 configuration information, and the QoS flow 4 identifier mapped to the DRB 3. The request message also carriers a data forwarding mode indication. The data forwarding mode indication may include forwarding based on the PDU Session.

In step 101, the secondary base station receives the request message and determines whether to accept splitting, including determining whether to accept splitting according to information in the request message and a resource condition of the secondary base station. The secondary base station establishes the DRB 2 and the DRB 3, maps the QoS flow 3 to the DRB 2, and maps the QoS flow 4 to the DRB 3. The secondary base station configures one piece of Xn interface data forwarding tunnel endpoint information for the PDU Session 2 according to the fact that the data forwarding mode indication is the forwarding based on the PDU Session.

In step 102, the secondary base station transmits a response message to the primary base station. The response message carries the PDU Session 2 information indicating acceptance, including the PDU Session 2 identifier, NG interface downlink tunnel endpoint information of the PDU Session 2, one piece of Xn interface data forwarding tunnel endpoint information of the PDU Session 2, and the QoS flow 3 identifier and the QoS flow 4 identifier in the PDU Session 2.

In step 103, the primary base station transmits an indication message to the core network after receiving the response message transmitted by the secondary base station. The indication message includes information of the PDU Session 2 to be split. The indication message specifically includes: the PDU Session 2 identifier, the NG interface downlink tunnel endpoint information, and the QoS flow 3 identifier and the QoS flow 4 identifier in the PDU Session 2. The indication message also carries a splitting mode indication (e.g. set to be splitting based on the PDU Session).

In step 104, the core network performs the splitting based on the PDU Session according to the indication message and the splitting mode indication, and splits the entire PDU Session 2 to be split to the secondary base station. This step may include: changing the NG interface downlink tunnel endpoint information of the PDU Session 2 into the received NG interface downlink tunnel endpoint information so as to transmit the subsequent data of the QoS flow 3 and the QoS flow 4 in the PDU Session 2 to the secondary base station.

In step 105, the core network transmits an acknowledgement message to the primary base station.

In step 106, the primary base station forwards the data according to the Xn interface data forwarding tunnel endpoint information received from the secondary base station. This step may include that:

according to the Xn interface data forwarding tunnel endpoint information of the PDU Session 2 received from the secondary base station, the data on the PDU Session 2 is transmitted to an Xn interface data forwarding tunnel corresponding to the tunnel endpoint information, and the primary base station releases the DRB 2 and the DRB 3. The secondary base station maps the QoS flows to the corresponding DRBs according to the QoS flow identifiers in a received forwarding data packet (i.e., the QoS flow 3 is mapped to the DRB 2 and the QoS flow 4 is mapped to the DRB 3).

Embodiment 2

Figure 12:
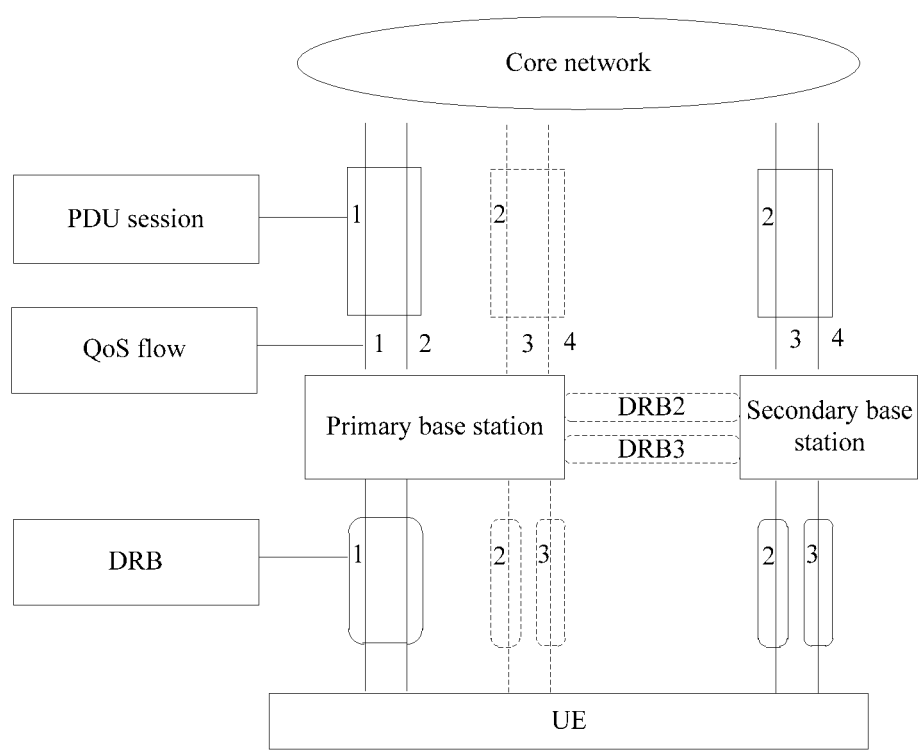
FIG. 12 is a schematic diagram of a network structure of Embodiment 2.

The embodiment is splitting based on the PDU session and forwarding based on the DRB. FIG. 12 is a schematic diagram of a network structure of Embodiment 2. As shown in FIG. 12, for a UE in the network, two PDU Sessions are established between a primary base station and a core network, and are assumed to be a PDU Session 1 and a PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the primary base station of the UE determines to split the PDU Session 2 to the secondary base station of the UE. Main implementation steps in Embodiment 2 are the same as steps in Embodiment 1. The steps are specifically described below.

The primary base station transmits a request message to the secondary base station. The request message carries information of the PDU Session 2 to be split. The PDU Session 2 information includes a PDU Session 2 identifier, NG interface uplink tunnel endpoint information of the PDU Session 2, an identifier of the QoS flow 3 in the PDU Session 2 and corresponding QoS profile information, and an identifier of the QoS flow 4 in the PDU Session 2 and corresponding QoS profile information. The request message also carries DRB 2 information and DRB 3 information. The DRB 2 information includes a DRB 2 identifier, corresponding DRB 2 configuration information and the QoS flow 3 identifier mapped to the DRB 2. The DRB 3 information includes a DRB 3 identifier, corresponding DRB 3 configuration information and the QoS flow 4 identifier mapped to the DRB 3. The request message also carriers a data forwarding mode indication (which is set to be forwarding based on the DRB).

The secondary base station determines whether to split according to the request message, including determining whether to accept splitting according to the request message and a resource condition of the secondary base station. The secondary base station establishes the DRB 2 and the DRB 3, maps the QoS flow 3 to the DRB 2, and maps the QoS flow 4 to the DRB 3. According to the fact that the data forwarding mode indication is forwarding based on the DRB, the secondary base station configures two pieces of Xn interface data forwarding tunnel endpoint information for the PDU Session 2, which are used for the DRB 2 and the DRB 3 respectively.

The secondary base station transmits a response message to the primary base station. The response message carries the PDU Session 2 information indicating acceptance, including the PDU Session 2 identifier, NG interface downlink tunnel endpoint information of the PDU Session 2, two pieces of Xn interface data forwarding tunnel endpoint information of the PDU Session 2, the DRB identifier or the QoS flow identifier list (including one or more QoS flow identifiers corresponding to one forwarding tunnel endpoint) corresponding to each forwarding tunnel endpoint, and the QoS flow 3 identifier and the QoS flow 4 identifier in the PDU Session 2.

The primary base station transmits an indication message to the core network after receiving the response message transmitted by the secondary base station. The indication message in the embodiment includes information of the PDU Session 2 to be split, including the PDU Session 2 identifier, the NG interface downlink tunnel endpoint information, and the QoS flow 3 identifier and the QoS flow 4 identifier in the PDU Session 2. The indication message also carries a splitting mode indication (which is set to be splitting based on the PDU Session).

The core network performs the splitting based on the PDU Session according to the indication message and the splitting mode indication, and splits the entire PDU Session 2 to be split to the secondary base station. This step includes: changing the NG interface downlink tunnel endpoint information of the PDU Session 2 into the received NG interface downlink tunnel endpoint information so as to transmit the subsequent data of the QoS flow 3 and the QoS flow 4 in the PDU Session 2 to the secondary base station.

The core network transmits an acknowledgement message to the primary base station.

The primary base station forwards the data according to the Xn interface data forwarding tunnel endpoint information received from the secondary base station. This step includes that: according to the Xn interface data forwarding tunnel endpoint information of the PDU Session 2 and corresponding QoS flow identifier received from the secondary base station, the data on the QoS flow 3 is transmitted to an Xn interface data forwarding tunnel corresponding to the QoS flow 3, the data on the QoS flow 4 is transmitted to an Xn interface data forwarding tunnel corresponding to the QoS flow 4, and the primary base station releases the DRB 2 and the DRB 3.

Embodiment 3

Figure 13:
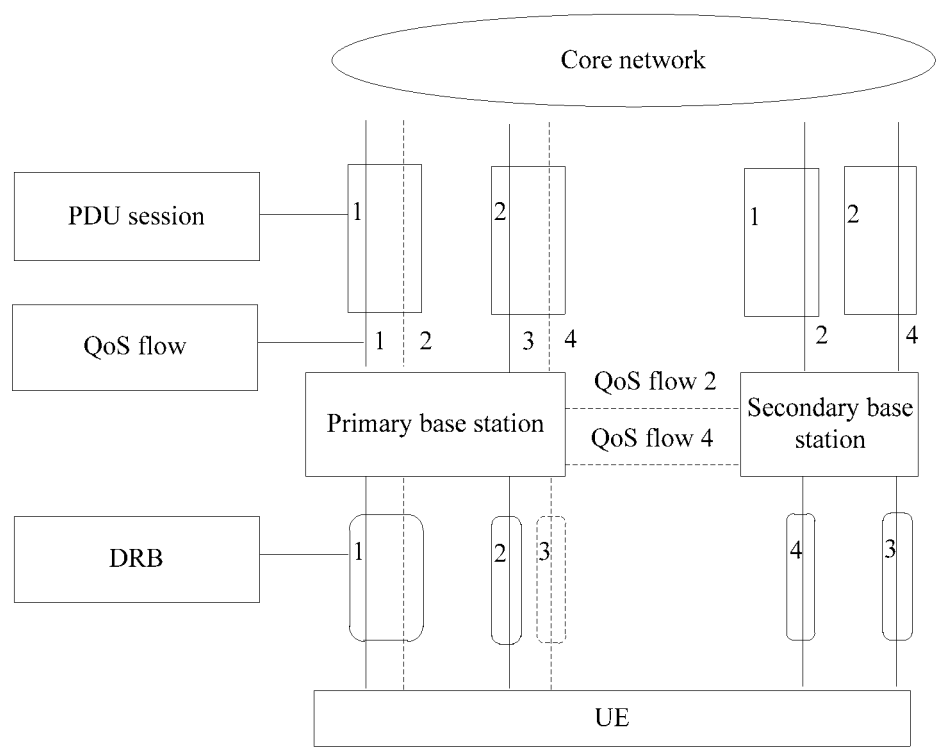
FIG. 13 is a schematic diagram of a network structure of Embodiment 3.

The embodiment is splitting and forwarding based on the QoS flow. FIG. 13 is schematic diagram of a network structure of Embodiment 3. As shown in FIG. 13, for a UE in the network, two PDU Sessions are established between a primary base station and a core network, and are assumed to be a PDU Session 1 and a PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the primary base station of the UE determines to split the QoS flow 2 and the QoS flow 4 to the secondary base station of the UE.

Figure 14:
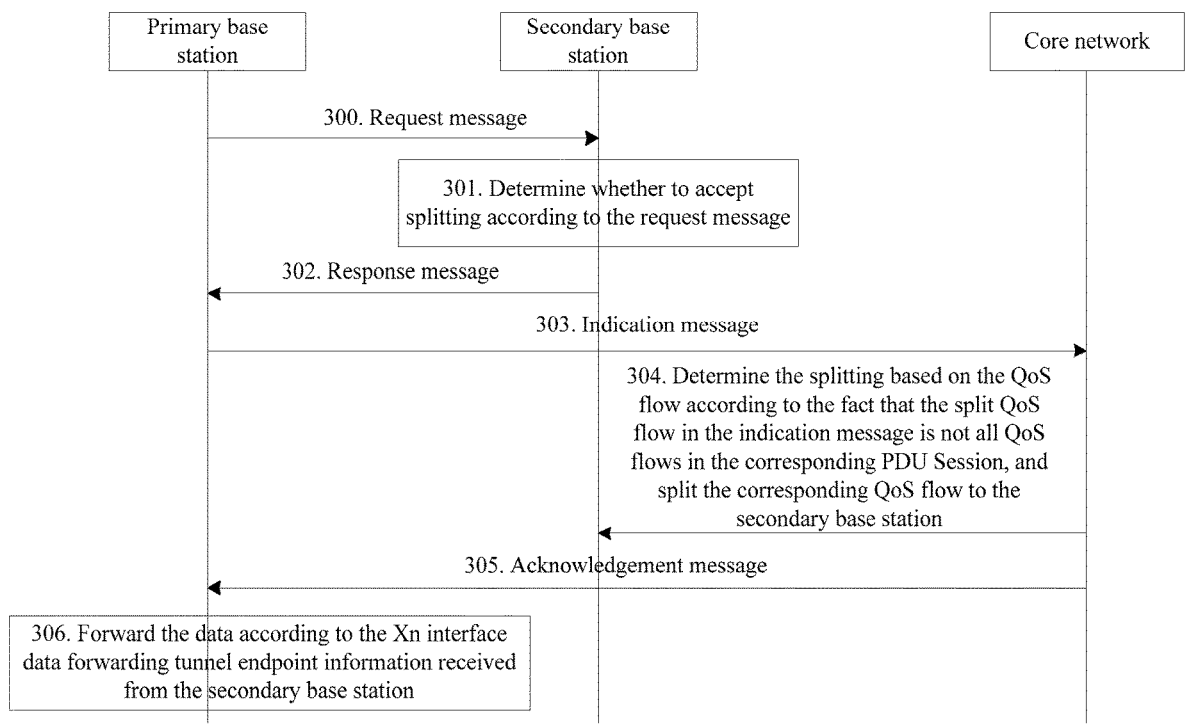
FIG. 14 is a method flowchart of Embodiment 3.

FIG. 14 is a method flowchart of Embodiment 3. As shown in FIG. 14, the method includes steps 300, 301, 302, 303, 304, 305 and 306 described below.

In step 300, the primary base station transmits a request message to the secondary base station. The request message carries information of the QoS flow to be split. The QoS flow information includes a PDU Session 1 identifier to which the QoS flow 2 belongs, NG interface uplink tunnel endpoint information of the PDU Session 1, a QoS flow 2 identifier and corresponding QoS profile information, a PDU Session 2 identifier to which the QoS flow 4 belongs, NG interface uplink tunnel endpoint information of the PDU Session 2, and a QoS flow 4 identifier and corresponding QoS profile information. The request message also carries DRB 1 information and DRB 3 information. The DRB 1 information includes a DRB 1 identifier, corresponding DRB 1 configuration information, and the QoS flow 1 identifier and the QoS flow 2 identifier mapped to which the DRB 1. The DRB 3 information includes a DRB 3 identifier, corresponding DRB 3 configuration information, and the QoS flow 4 identifier mapped to the DRB 3.

In step 301, the secondary base station determines whether to accept splitting according to the request message, including determining whether to accept splitting according to the request message and a resource condition of the secondary base station. The secondary base station establishes the DRB 4 (for mapping the QoS flow 2) and the DRB 3 (for mapping the QoS flow 4). The secondary base station determines the forwarding based on the QoS flow, and configures one piece of Xn interface data forwarding tunnel endpoint information for each of the QoS flow 2 and the QoS flow 4.

In step 302, the secondary base station transmits a response message to the primary base station. The response message in the embodiment carries the QoS flow 2 information and the QoS flow 4 information indicating acceptance. The response message includes the PDU Session 1 identifier to which the QoS flow 2 belongs, NG interface downlink tunnel endpoint information of the PDU Session 1, Xn interface data forwarding tunnel endpoint information of the QoS flow 2, the PDU Session 2 identifier to which the QoS flow 4 belongs, NG interface downlink tunnel endpoint information of the PDU Session 2, and Xn interface data forwarding tunnel endpoint information of the QoS flow 4.

In step 303, the primary base station transmits an indication message to the core network after receiving the response message transmitted by the secondary base station. The response message in the embodiment is a response message indicating acceptance and carries information of the QoS flow 2 and the QoS flow 4 to be split. The response message includes the PDU Session 1 identifier to which the QoS flow 2 belongs, the NG interface downlink tunnel endpoint information of the PDU Session 1 received from the secondary base station, the PDU Session 2 identifier to which the QoS flow 4 belongs, and the NG interface downlink tunnel endpoint information of the PDU Session 2 received from the secondary base station.

In step 304, the core network determines the splitting based on the QoS flow according to the fact that the split QoS flow in the indication message is not all QoS flows in the corresponding PDU Session (referring to the related art, the core network may know the condition of all QoS flows in the PDU Session), and splits the corresponding QoS flow to the secondary base station. This step includes: adding received NG interface downlink tunnel endpoint information into the NG interface downlink tunnel endpoint information of the PDU Session 1, and associating the added downlink tunnel endpoint with the QoS flow 2 so as to transmit the subsequent data of the QoS flow 2 in the PDU Session 1 to the secondary base station; and adding the received NG interface downlink tunnel endpoint information into the NG interface downlink tunnel endpoint information of the PDU Session 2, and associating the added downlink tunnel endpoint with the QoS flow 4 so as to transmit the subsequent data of the QoS flow 4 in the PDU Session 2 to the secondary base station.

In step 305, the core network transmits an acknowledgement message to the primary base station.

In step 306, the primary base station forwards the data according to the Xn interface data forwarding tunnel endpoint information received from the secondary base station. This step includes: the primary base station transmits the data on the QoS flow 2 to an Xn interface data forwarding tunnel corresponding to the tunnel endpoint information according to the Xn interface data forwarding tunnel endpoint information of the QoS flow 2 received from the secondary base station, transmits the data on the QoS flow 4 to an Xn interface data forwarding tunnel corresponding to the tunnel endpoint information according to the Xn interface data forwarding tunnel endpoint information of the QoS flow 4 received from the secondary base station, and releases the DRB 3. The secondary base station maps the QoS flows to the corresponding DRBs according to the QoS flow identifiers in a received forwarding data packet (i.e., the QoS flow 2 is mapped to the DRB 4, and the QoS flow 4 is mapped to the DRB 3).

Embodiment 4

Figure 15:
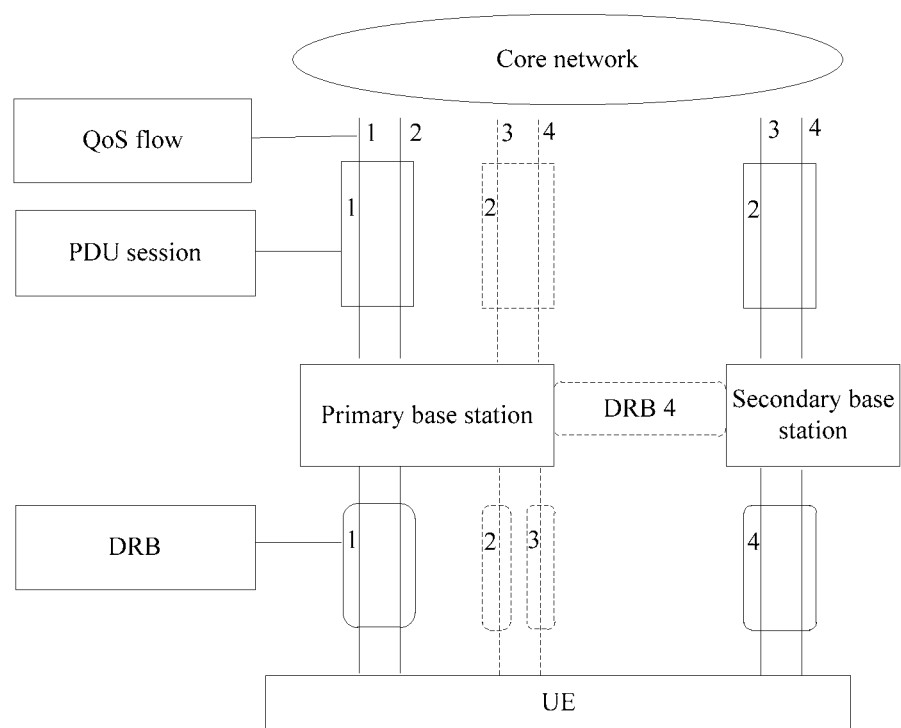
FIG. 15 is a schematic diagram of a network structure of Embodiment 4.

The embodiment is splitting based on the QoS session and forwarding based on the DRB. FIG. 15 is a schematic diagram of a network structure of Embodiment 4. As shown in FIG. 15, for a UE in the network, two PDU Sessions are established between a primary base station and a core network, and are assumed to be the PDU Session 1 and the PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the primary base station of the UE determines to split the PDU Session 2 to the secondary base station of the UE. Main implementation steps in Embodiment 4 are the same as steps in Embodiment 1. The steps are specifically described below.

The primary base station transmits a request message to the secondary base station. The request message carries information of the PDU Session 2 to be split. The request message includes a PDU Session 2 identifier, NG interface uplink tunnel endpoint information of the PDU Session 2, an identifier of the QoS flow 3 in the PDU Session 2 and corresponding QoS profile information, and an identifier of the QoS flow 4 in the PDU Session 2 and corresponding QoS profile information. The request message also carries DRB 2 information and DRB 3 information. The DRB 2 information includes a DRB 2 identifier, corresponding DRB 2 configuration information and the QoS flow 3 identifier mapped to the DRB 2. The DRB 3 information includes a DRB 3 identifier, corresponding DRB 3 configuration information and the QoS flow 4 identifier mapped to the DRB 3.

The secondary base station determines whether to accept splitting according to the request message, including determining whether to accept splitting according to the request message and a resource condition of the secondary base station. The secondary base station establishes the DRB 4 and maps the QoS flow 3 and the QoS flow 4 to the DRB 4. The secondary base station determines the forwarding based on the DRB, and configures one piece of Xn interface data forwarding tunnel endpoint information for the PDU Session 2, which is used for the DRB 4.

The secondary base station transmits a response message to the primary base station. The response message carries the PDU Session 2 information indicating acceptance. The response message includes the PDU Session 2 identifier, NG interface downlink tunnel endpoint information of the PDU Session 2, one piece of Xn interface data forwarding tunnel endpoint information of the PDU Session 2, and the QoS flow 3 identifier and the QoS flow 4 identifier in the PDU Session 2.

The primary base station transmits an indication message to the core network after receiving the response message transmitted by the secondary base station. The indication message includes information of the PDU Session 2 to be split. The indication message includes the PDU Session 2 identifier, the NG interface downlink tunnel endpoint information, and the QoS flow 3 identifier and the QoS flow 4 identifier in the PDU Session 2.

The core network performs the splitting based on the PDU Session according to the fact that the split QoS flow in the indication message is all QoS flows in the PDU Session (the core network knows the condition of all QoS flows in the PDU Session), and splits the entire PDU Session 2 to be split to the secondary base station. This step includes: changing the NG interface downlink tunnel endpoint information of the PDU Session 2 into the received NG interface downlink tunnel endpoint information so as to transmit the subsequent data of the QoS flow 3 and the QoS flow 4 in the PDU Session 2 to the secondary base station.

The core network transmits an acknowledgement message to the primary base station.

The primary base station forwards the data according to the Xn interface data forwarding tunnel endpoint information received from the secondary base station. This step includes: the primary base station transmits the data on the QoS flow 3 and the QoS flow 4 to an Xn interface data forwarding tunnel corresponding to the tunnel endpoint information according to the Xn interface data forwarding tunnel endpoint information of the PDU Session 2 received from the secondary base station, and releases the DRB 2 and the DRB 3.

Embodiment 5

Figure 16:
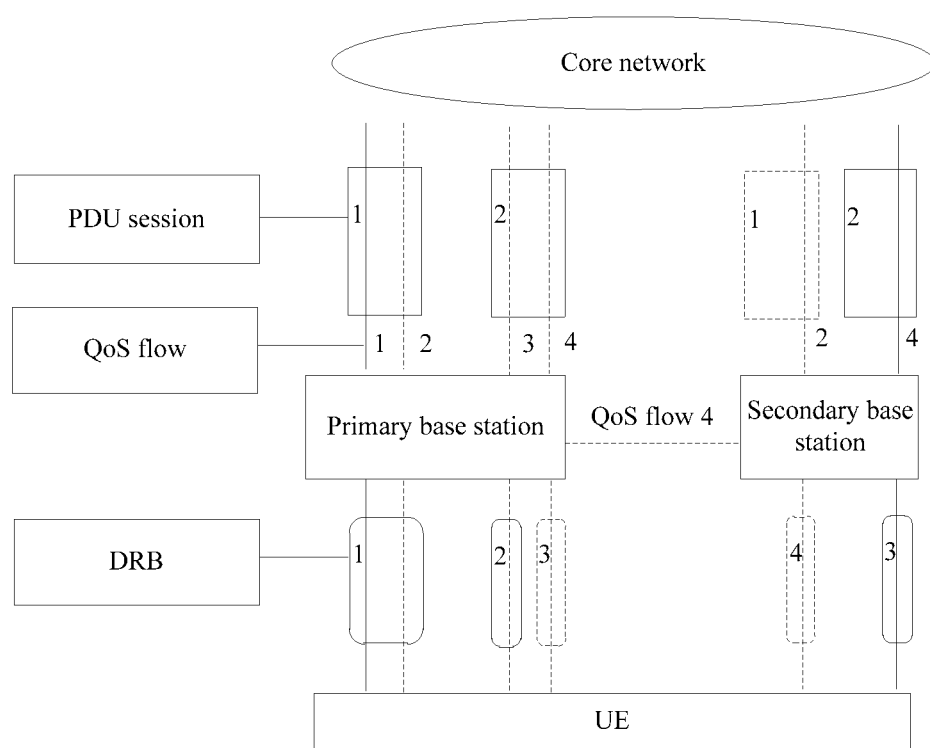
FIG. 16 is a schematic diagram of a network structure of Embodiment 5.

The embodiment is splitting and forwarding based on the QoS flow. FIG. 16 is a schematic diagram of a network structure of Embodiment 5. As shown in FIG. 16, for a UE in the network, two PDU Sessions are established between a primary base station and a core network, and are assumed to be a PDU Session 1 and a PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the primary base station of the UE determines to split the QoS flow 2, the QoS flow 3 and the QoS flow 4 to the secondary base station of the UE.

Figure 17:
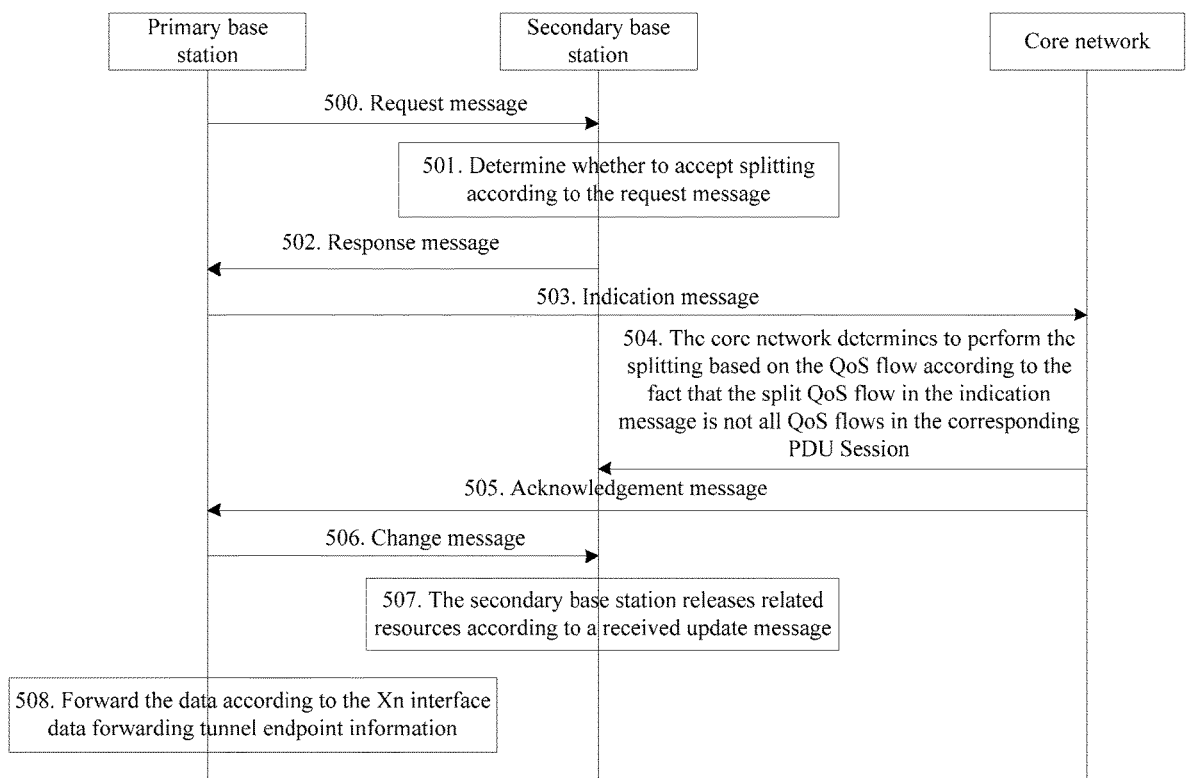
FIG. 17 is a method flowchart of Embodiment 5.

FIG. 17 is a method flowchart of Embodiment 5. As shown in FIG. 17, the method includes steps 500, 501, 502, 503, 504, 505, 506, 507 and 508 described below.

In step 500, the primary base station transmits a request message to the secondary base station. The request message carries information of the QoS flow to be split. The request message includes a PDU Session 1 identifier to which the QoS flow 2 belongs, NG interface uplink tunnel endpoint information of the PDU Session 1, a QoS flow 2 identifier and corresponding QoS profile information, a PDU Session 2 identifier to which the QoS flow 3 and the QoS flow 4 belong, NG interface uplink tunnel endpoint information of the PDU Session 2, and a QoS flow 3 identifier and a QoS flow 4 identifier and corresponding QoS profile information. The request message also carries DRB 1 information, DRB 2 information and DRB 3 information. The DRB 1 information includes a DRB 1 identifier, corresponding DRB 1 configuration information, and the QoS flow 1 identifier and the QoS flow 2 identifier mapped to the DRB 1. The DRB 2 information includes a DRB 2 identifier, corresponding DRB 2 configuration information, and the QoS flow 3 identifier mapped to the DRB 2. The DRB 3 information includes a DRB 3 identifier, corresponding DRB 3 configuration information, and the QoS flow 4 identifier mapped to the DRB 3.

In step 501, the secondary base station determines whether to accept splitting according to the request message, including determining whether to partly accept the splitting (e.g., to accept the splitting of the QoS flow 2 and the QoS flow 4, and to reject the splitting of the QoS flow 3) according to the request message and a resource condition of the secondary base station. The secondary base station establishes the DRB 4 (used for mapping the QoS flow 2) and the DRB 3 (used for mapping the QoS flow 4).

In step 502, the secondary base station transmits a response message to the primary base station. The response message carries the QoS flow 2 information and the QoS flow 4 information indicating acceptance. The response message includes the PDU Session 1 identifier to which the QoS flow 2 belongs, NG interface downlink tunnel endpoint information of the PDU Session 1, the QoS flow 2 identifier, Xn interface data forwarding tunnel endpoint information of the QoS flow 2, the PDU Session 2 identifier to which the QoS flow 4 belongs, NG interface downlink tunnel endpoint information of the PDU Session 2, the QoS flow identifier, and Xn interface data forwarding tunnel endpoint information of the QoS flow 4. The response message also carries the PDU Session 2 identifier to which the QoS flow 3 accepted to be split belongs and the QoS flow 3 identifier.

In step 503, the primary base station transmits an indication message to the core network after receiving the response message transmitted by the secondary base station. This step includes: after receiving the response message and knowing that the secondary base station accepts the splitting of the QoS flow 2 and the QoS flow 4 and does not accept the splitting of the QoS flow 3, transmitting the indication message to the core network. The indication message carries the information of the QoS flow 2 and the QoS flow 4 to be split, and includes the PDU Session 1 identifier to which the QoS flow 2 belongs, NG interface downlink tunnel endpoint information of the PDU Session 1 received from the secondary base station, the PDU Session 2 identifier to which the QoS flow 4 belongs, and NG interface downlink tunnel endpoint information of the PDU Session 2 received from the secondary base station.

In step 504, the core network performs the splitting based on the QoS flow according to the fact that the split QoS flow in the indication message is not all QoS flows in the PDU Session (the core network knows the condition of all QoS flows in the PDU Session), which includes accepting the splitting of the QoS flow 4 and not accepting the splitting of QoS flow 2 according to the actual condition. This step includes: adding received NG interface downlink tunnel endpoint information into the NG interface downlink tunnel endpoint information of the PDU Session 2, and associating the added downlink tunnel endpoint with the QoS flow 4 so as to transmit the subsequent data of the QoS flow 4 in the PDU Session 2 to the secondary base station.

In step 505, the core network transmits an acknowledgement message. The acknowledgement message carries the PDU Session 2 identifier to which the QoS flow 4 accepted to be split belongs, the QoS flow 4 identifier, the PDU Session 1 identifier to which the QoS flow 2 rejected to be split belongs, and the QoS flow 2 identifier.

In step 506, the primary base station transmits a change message to the secondary base station. The change message carries the PDU Session 1 identifier to which the QoS flow 2 canceled to be split belongs, and the QoS flow 2 identifier.

In step 507, the secondary base station releases related resources according to a received update message. This step includes: receiving the change message and releasing resources related to QoS flow 2. This includes releasing the DRB 4 corresponding to the QoS flow 2.

In step 508, the primary base station forwards the data according to the Xn interface data forwarding tunnel endpoint information. This step includes that: the primary base station transmits the data on the QoS flow 4 to an Xn interface data forwarding tunnel corresponding to the tunnel endpoint information according to the Xn interface data forwarding tunnel endpoint information of the QoS flow 4 received from the secondary base station, and the primary base station releases the DRB 3. The secondary base station maps the QoS flow to the corresponding DRB according to the QoS flow identifier in a received forwarding data packet (i.e., the QoS flow 4 is mapped to to the DRB 3).

Embodiment 6

Figure 18:
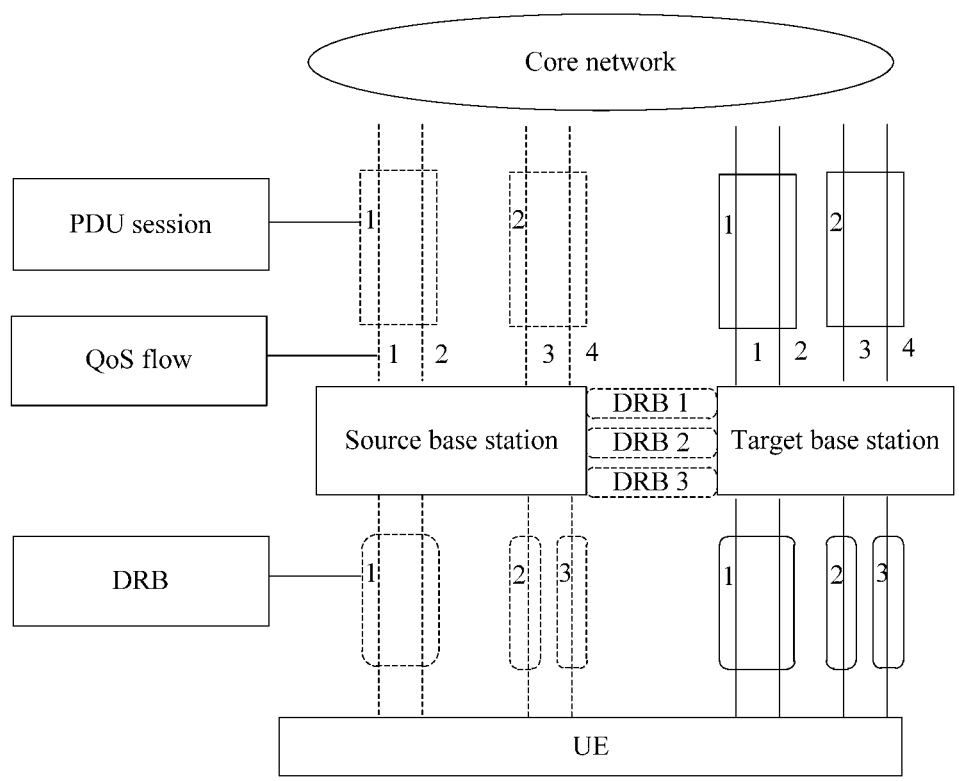
FIG. 18 is a schematic diagram of a network structure of Embodiment 6.

The embodiment mainly relates to handover and splitting based on the DRB. FIG. 18 is a schematic diagram of a network structure of Embodiment 6. As shown in FIG. 18, for a UE in the network, two PDU Sessions are established between a source base station and a core network, and are assumed to be a PDU Session 1 and a PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the source base station of the UE determines to hand the UE over to a target base station.

Figure 19:
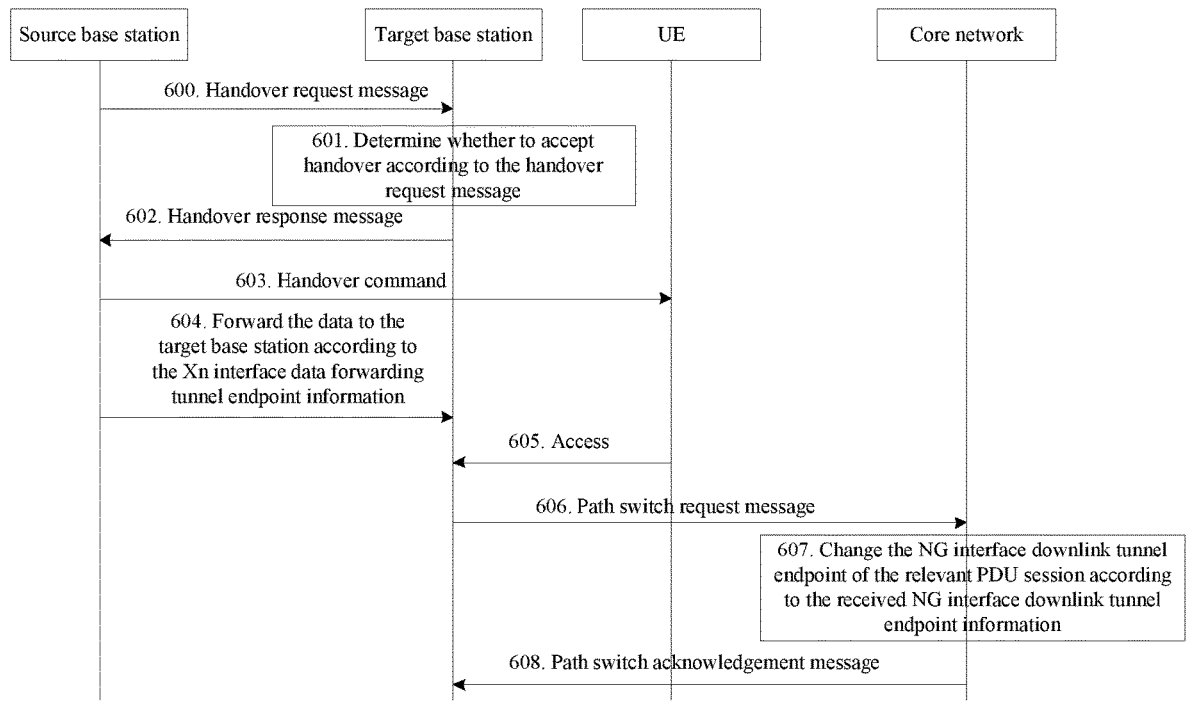
FIG. 19 is a method flowchart of Embodiment 6.

FIG. 19 is a method flowchart of Embodiment 6. As shown in FIG. 19, the method includes steps 600, 601, 602, 603, 604, 605, 606, 607 and 608 described below.

In step 600, the source base station transmits a handover request message to the target base station. The handover request message carries PDU Session 1 information and PDU Session 2 information. The PDU Session 1 information includes a PDU Session 1 identifier, NG interface uplink tunnel endpoint information, a QoS flow 1 identifier and corresponding QoS profile information, a QoS flow 2 identifier and corresponding QoS profile information, and a DRB 1 identifier to which the QoS flow 1 and the QoS flow 1 are mapped and corresponding DRB configuration information. The PDU Session 2 information includes a PDU Session 2 identifier, NG interface uplink tunnel endpoint information, a QoS flow 3 identifier and corresponding QoS profile information, a QoS flow 4 identifier and corresponding QoS profile information, a DRB 2 identifier to which the QoS flow 3 is mapped and corresponding DRB configuration information, and a DRB 3 identifier to which the QoS flow 4 is mapped and corresponding DRB configuration information.

In step 601, the target base station determines whether to accept handover according to the handover request message, including accepting the handover according to the handover request message and a resource condition of the handover request message. The target base station establishes the DRB 1, the DRB 2 and the DRB 3, maps the QoS flow 1 and the QoS flow 2 to the DRB 1, maps the QoS flow 3 to the DRB 2, and maps the QoS flow 4 to the DRB 3.

In step 602, the target base station transmits a handover response message to the source base station. The handover response message carries Xn interface data forwarding tunnel endpoint information respectively based on the DRB 1, the DRB 2 and the DRB 3 on a target base station side.

In step 603, the source base station transmits a handover command to the UE after receiving the response message of the target base station.

In step 604, the source base station forwards data to the target base station according to the Xn interface data forwarding tunnel endpoint information. This step includes that: the source base station forwards the data to the target base station according to the received Xn interface data forwarding tunnel endpoint information based on DRB.

In step S605, the UE access the target base station.

In step 606, the target base station transmits a path switch request message to the core network after the UE accesses successfully. The path switch request message carries the NG interface downlink tunnel endpoint information, and includes NG interface downlink tunnel endpoint information of the PDU Session 1 and the PDU Session 2.

In step 607, the core network changes the NG interface downlink tunnel endpoint of the relevant PDU session according to the received NG interface downlink tunnel endpoint information so as to transmit subsequent data to the target base station.

In step 608, the core network transmits a path switch acknowledgement message to the target base station.

Embodiment 7

Figure 20:
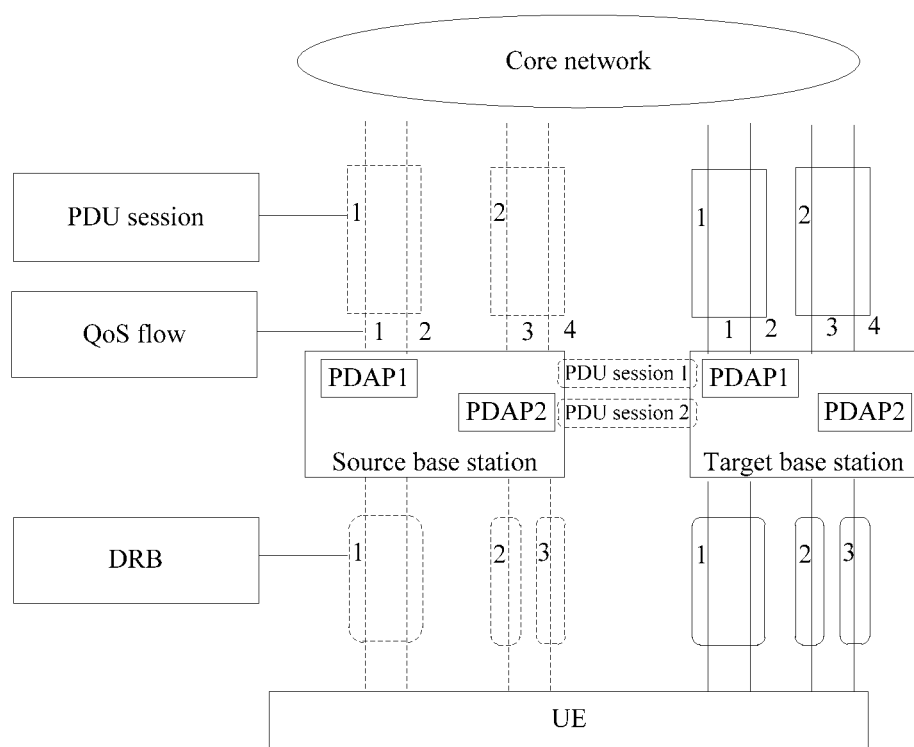
FIG. 20 is a schematic diagram of a network structure of Embodiment 7.

The embodiment mainly relates to handover and forwarding based on the PDU session. FIG. 20 is a schematic diagram of a network structure of Embodiment 7. As shown in FIG. 20, for a UE in the network, two PDU Sessions are established between a source base station and a core network, and are assumed to be a PDU Session 1 and a PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the source base station of the UE determines to hand the UE over to a target base station. Main implementation steps in Embodiment 7 are the same as steps in Embodiment 6. The steps are specifically described below.

The source base station transmits a handover request message to the target base station. The handover request message carries PDU Session 1 information and PDU Session 2 information. The PDU Session 1 information includes a PDU Session 1 identifier, NG interface uplink tunnel endpoint information, a QoS flow 1 identifier and corresponding QoS profile information, a QoS flow 2 identifier and corresponding QoS profile information, and a DRB 1 identifier to which the QoS flow 1 and the QoS flow 1 are mapped and corresponding DRB configuration information. The PDU Session 2 information includes a PDU Session 2 identifier, NG interface uplink tunnel endpoint information, a QoS flow 3 identifier and corresponding QoS profile information, a QoS flow 4 identifier and corresponding QoS profile information, a DRB 2 identifier to which the QoS flow 3 is mapped and corresponding DRB configuration information, and a DRB 3 identifier to which the QoS flow 4 is mapped and corresponding DRB configuration information.

The target base station determines whether to accept handover according to the handover request message, including accepting the handover according to the handover request message and a resource condition of the target base station. The target base station establishes the DRB 1, the DRB 2 and the DRB 3, maps the QoS flow 1 and the QoS flow 2 to the DRB 1, maps the QoS flow 3 to the DRB 2, and maps the QoS flow 4 to the DRB 3.

The target base station transmits a handover response message to the source base station. The handover response message carries Xn interface data forwarding tunnel endpoint information respectively based on the PDU Session 1 and the PDU Session 2 on a target base station side.

The source base station transmits a handover command to the UE after receiving the handover response message transmitted by the target base station.

The source base station forwards the data according to the received Xn interface data forwarding tunnel endpoint information. This step includes that: the source base station forwards data to the target base station according to the received Xn interface data forwarding tunnel endpoint information based on the PDU Session, and a PDAP entity of the source base station adds a DRB identifier number to each data packet forwarded by the Xn interface, so that the PDAP entity of the target base station can match the DRB of the data packet transmitted by the target base station side according to the DRB identifier in the data packet forwarded by the Xn interface.

The UE access the target base station.

The target base station transmits a path switch request message to the core network after the UE accesses successfully. The NG interface downlink tunnel endpoint information carried in the path switch request message includes NG interface downlink tunnel endpoint information of the PDU Session 1 and the PDU Session 2.

The core network changes the NG interface downlink tunnel endpoints of the PDU Session 1 and the PDU Session 2 according to the received NG interface downlink tunnel endpoint information so as to transmit subsequent data to the target base station.

The core network transmits a path switch acknowledgement message to the target base station.

Embodiment 8

Figure 21:
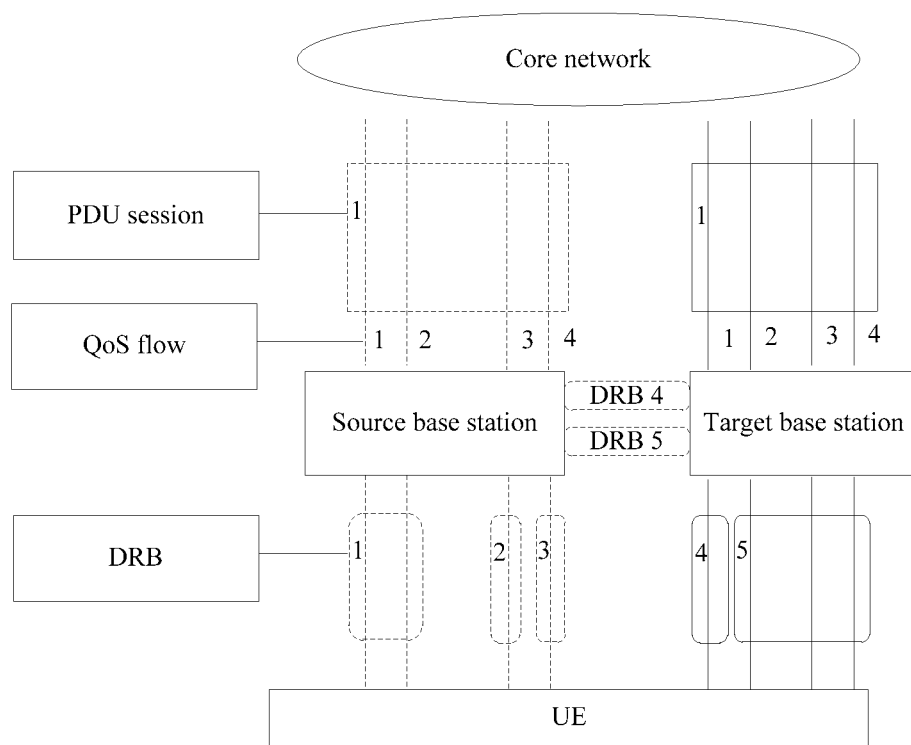
FIG. 21 is a schematic diagram of a network structure of Embodiment 8.

The embodiment mainly relates to handover and forwarding based on the DRB. FIG. 21 is schematic diagram of a network structure of Embodiment 8. As shown in FIG. 21, for a UE in the network, one PDU Session is established between a source base station and a core network, and is assumed to be a PDU Session 1. The PDU Session 1 includes a QoS flow 1, a QoS flow 2, a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the source base station of the UE determines to hand the UE over to a target base station. Main implementation steps in Embodiment 8 are the same as steps in Embodiment 7. The steps are specifically described below.

The source base station transmits a handover request message to the target base station. The handover request message carries a PDU Session 1 identifier, NG interface uplink tunnel endpoint information of the PDU Session 1, identifiers of the QoS flow 1, the QoS flow 2, the QoS flow 3 and the QoS flow 4 and corresponding QoS profile information, a DRB 1 identifier to which the QoS flow 1 and the QoS flow 2 are mapped and corresponding DRB configuration information, a DRB 2 identifier to which the QoS flow 3 is mapped and corresponding DRB configuration information, and a DRB 3 identifier to which the QoS flow 4 is mapped and corresponding DRB configuration information.

The target base station determines whether to accept handover according to the handover request message, including accepting the handover according to the handover request message and a resource condition of the target base station, and re-mapping QoS flows to DRBs. The target base station establishes a DRB 4 and a DRB 5, re-maps the QoS flow 1 to the DRB 4, and re-maps the QoS flow 2, the QoS flow 3 and the QoS flow 4 to the DRB 5.

The target base station transmits a handover response message to the source base station. The handover response message carries Xn interface data forwarding tunnel endpoint information respectively based on the DRB 4 and the DRB 5 on the target base station side and re-mapping information on the target base station side (i.e., the QoS flow 1 is re-mapped to the DRB 4, and the QoS flow 2, the QoS flow 3 and the QoS flow 4 are re-mapped to the DRB 5).

The source base station transmits a handover command to the UE after receiving the response message of the target base station. The response message is a response message indicating acceptance of handover.

The source base station forwards the data to the target base station according to the received Xn interface data forwarding tunnel endpoint information. This step includes that: the source base station forwards data to the target base station according to the received Xn interface data forwarding tunnel endpoint information based on the DRB, transmits a data packet from the QoS flow 1 to a Xn interface data forwarding tunnel based on the DRB 4, and transmits data packets from the QoS flow 2, the QoS flow 3 and the QoS flow 4 to the Xn interface data forwarding tunnel based on the DRB 5.

The UE access the target base station.

The target base station transmits a path switch request message to the core network after the UE accesses successfully. The NG interface downlink tunnel endpoint information carried in the path switch request message includes NG interface downlink tunnel endpoint information of the PDU Session 1.

The core network changes the NG interface downlink tunnel endpoint of the PDU Session 1 according to the received NG interface downlink tunnel endpoint information so as to transmit subsequent data to the target base station.

The core network transmits a path switch acknowledgement message to the target base station.

Embodiment 9

Figure 22:
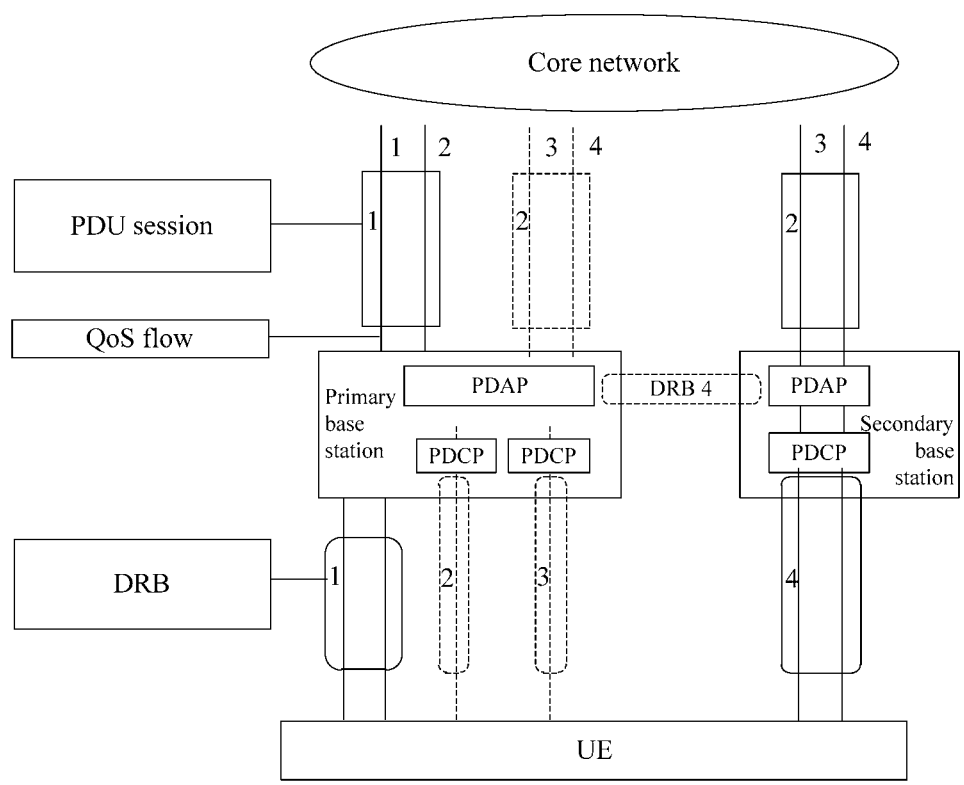
FIG. 22 is a schematic diagram of a network structure of Embodiment 9.
Figure 23:
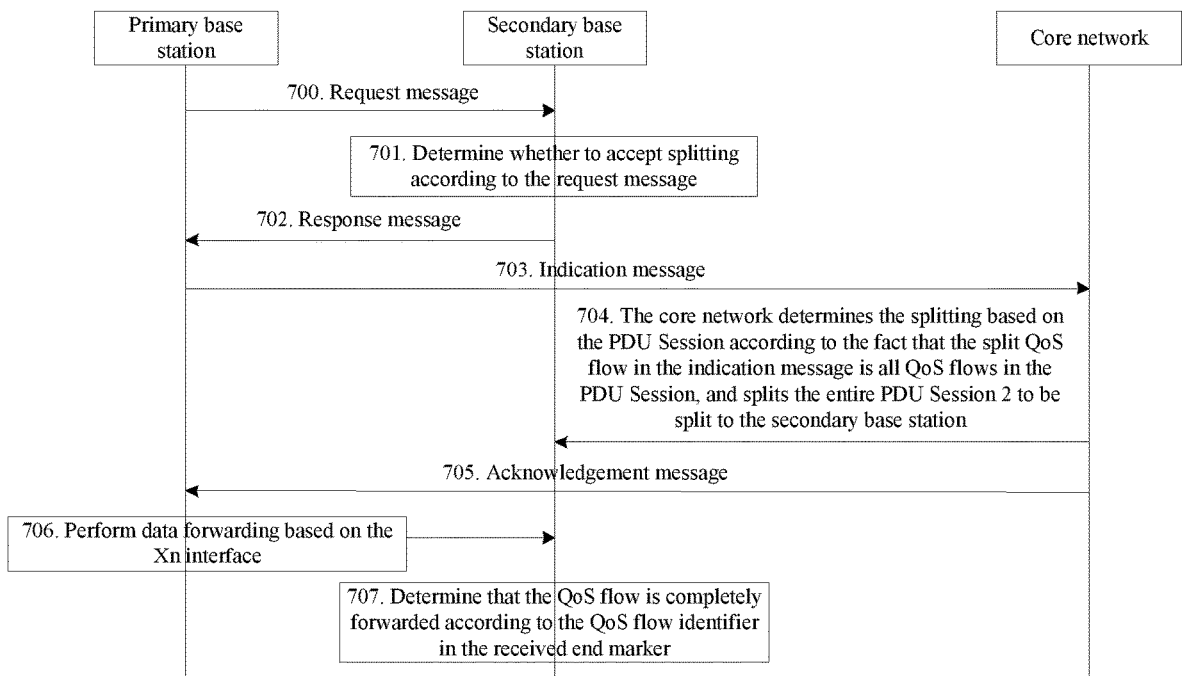
FIG. 23 is a method flowchart of Embodiment 9.

The embodiment mainly relates to splitting based on the PDU session, switching based on the DRB, re-mapping and end marker processing. FIG. 22 is schematic diagram of a network structure of Embodiment 9. As shown in FIG. 22, for a UE in the network, two PDU Sessions are established between a primary base station and a core network, and are assumed to be a PDU Session 1 and a PDU Session 2. The PDU Session 1 includes a QoS flow 1 and a QoS flow 2, and the PDU Session 2 includes a QoS flow 3 and a QoS flow 4. The QoS flow 1 and the QoS flow 2 are mapped to the DRB 1, the QoS flow 3 is mapped to the DRB 2, and the QoS flow 4 is mapped to the DRB 3. In the embodiment, the source base station of the UE determines to split the PDU Session 2 to a secondary base station of the UE. FIG. 23 is a method flowchart of Embodiment 9. As shown in FIG. 23, the method includes steps 700, 701, 702, 703, 704, 705, 706, 707 and 708 described below.

In step 700, the primary base station transmits a request message to the secondary base station. The request message carries information of the PDU Session to be split. The PDU Session information includes a PDU Session 2 identifier, NG interface uplink tunnel endpoint information of the PDU Session 2, a QoS flow 3 identifier and corresponding QoS profile information, and a QoS flow 4 identifier and corresponding QoS profile information, a DRB 2 identifier to which the QoS flow 3 is mapped and corresponding DRB configuration information, and a DRB 3 identifier to which the QoS flow 4 is mapped and corresponding DRB configuration information.

In step 701, the secondary base station determines whether to accept splitting according to the request message. In the embodiment, the secondary base station accepts the splitting according to the request message and a resource condition of the secondary base station, and re-maps QoS flows to DRBs. The secondary base station establishes a DRB 4 and maps the QoS flow 3 and the QoS flow 4 to the DRB 4.

In step 702, the secondary base station transmits a response message to the primary base station. The response message carries the NG interface downlink tunnel endpoint information of the PDU Session 2 on a secondary base station side, Xn interface data forwarding tunnel endpoint information based on the DRB 4 on a target base station side, and re-mapping information on the target base station (i.e., the QoS flow 3 and the QoS flow 4 are re-mapped to the DRB 4).

In step 703, the primary base station transmits an indication message to the core network after receiving the response message transmitted by the secondary base station. This step includes that: the primary base station transmits the indication message to the core network after receiving the response message indicating splitting of the secondary base station. The indication message includes information of the PDU Session 2 to be split, and includes the PDU Session 2 identifier, the NG interface downlink tunnel endpoint information on the secondary base station, and the QoS flow 3 identifier and the QoS flow 4 identifier in the PDU Session 2.

In step 704, the core network determines the splitting based on the PDU Session according to the fact that the split QoS flow in the indication message is all QoS flows in the PDU Session (the core network knows the condition of all QoS flows in the PDU Session), and splits the entire PDU Session 2 to be split to the secondary base station. This step includes: the NG interface downlink tunnel endpoint information of the PDU Session 2 is changed into the received NG interface downlink tunnel endpoint information. The core network transmits an end marker including the QoS flow 3 identifier after transmitting the last data packet of the QoS flow 3 to the primary base station, and transmits an end marker including the QoS flow 4 identifier after transmitting the last data packet of the QoS flow 4 to the primary base station. Then, the data on the PDU Session 2 is transmitted to the secondary base station.

In step 705, the core network transmits an acknowledgement message to the primary base station.

In step 706, the primary base station performs data forwarding based on the Xn interface. This step includes that: the primary base station performs the Xn interface data forwarding based on the DRB, and the primary base station transmits data packets from the QoS flow 3 and the QoS flow 4 to the Xn interface data forwarding tunnel (including each end marker) based on the DRB 4.

In step 707, a PDAP entity of the secondary base station determines that the QoS flow is completely forwarded according to the QoS flow identifier in the received end marker; and after the end markers of all QoS flows mapped to the DRB are collected, determines that the new data from the core network (not forwarding data from the primary base station) is transmitted on the DRB.

Embodiment 10

Figure 24:
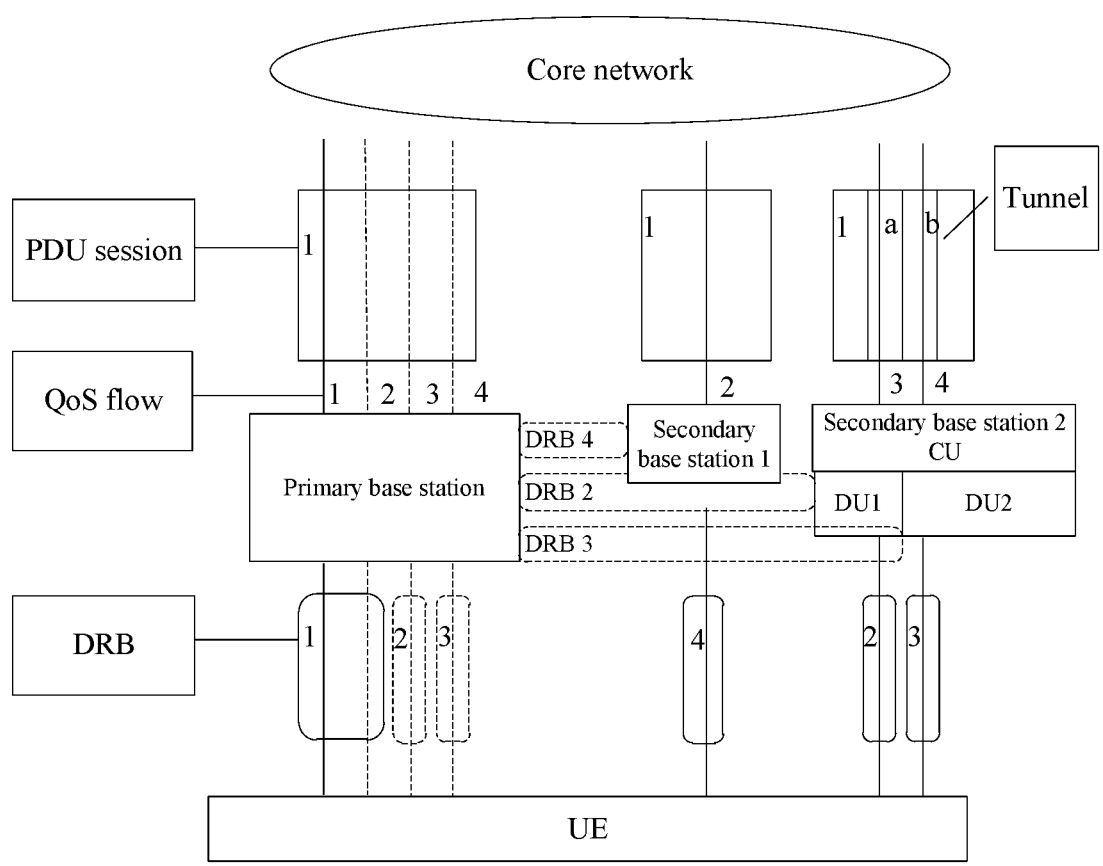
FIG. 24 is a schematic diagram of a network structure of Embodiment 10.
Figure 25:
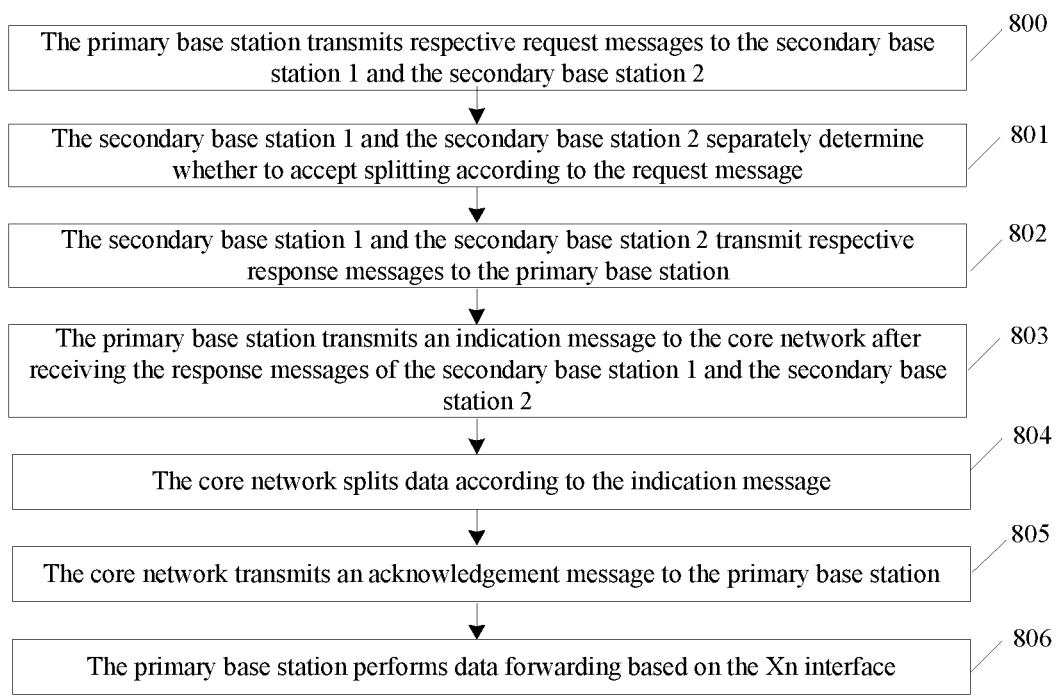
FIG. 25 is a method flowchart of Embodiment 10.

The embodiment mainly relates to multi-path splitting and forwarding based on the DRB. FIG. 24 is a schematic diagram of a network structure of Embodiment 10. As shown in FIG. 24, for a UE in the network, two PDU Sessions are established between a primary base station and a core network, and are assumed to be a PDU Session 1 and a PDU Session 2. The PDU Session 1 includes a QoS flow 1, a QoS flow 2, a QoS flow 3 and a QoS flow 4. The QoS flow 1 and the QoS flow 2 are mapped to a DRB 1, the QoS flow 3 is mapped to a DRB 2, and the QoS flow 4 is mapped to a DRB 3. In the embodiment, the primary base station of the UE determines to split the QoS flow 2 to a secondary base station 1 of the UE, and split the QoS flow 3 and the QoS flow 4 to a secondary base station 2 of the UE. FIG. 25 is a method flowchart of Embodiment 10. As shown in FIG. 25, the method includes steps 800, 801, 802, 803, 804, 805, 806, 807 and 808 described below.

In step 800, the primary base station transmits respective request messages to the secondary base station 1 and the secondary base station 2. This step includes that: the primary base station transmits a first request message to the secondary base station 1, where the request message carries a PDU Session 1 identifier, NG interface uplink tunnel endpoint information of the PDU Session 1, a QoS flow 2 identifier and corresponding QoS profile information, and a DRB 1 identifier to which the QoS flow 2 is mapped and corresponding DRB configuration information; and transmits a second request message to the secondary base station 2, where the request message carries the PDU Session 1 identifier, the NG interface uplink tunnel endpoint information of the PDU Session 1, identifiers of the QoS flow 3 and the QoS flow 4 and corresponding QoS profile information, a DRB 2 identifier to which the QoS flow 3 is mapped and corresponding DRB configuration information, and a DRB 3 identifier to which the QoS flow 4 is mapped and corresponding DRB configuration information.

In step 801, the secondary base station 1 and the secondary base station 2 separately determine whether to accept splitting according to the request message. This step includes that: the secondary base station 1 determines whether to accept splitting according to the first request message, and in the embodiment, accepts the splitting according to the first request message and a resource condition of the secondary base station 1 but re-maps the QoS flow to the DRB; the secondary base station 1 establishes the DRB 4 and maps the QoS flow 2 to the DRB 4; the secondary base station 2 determines whether to accept splitting according to the second request message; and the secondary base station 2 accepts the splitting according to the information in the second request message and a resource condition of the secondary base station 2, establishes the DRB 2 (located in a DU 1) and the DRB 3 (located in a DU 2), maps the QoS flow 3 to the DRB 2, and maps the QoS flow 4 to the DRB 3.

In step 802, the secondary base station 1 and the secondary base station 2 transmit respective response message to the primary base station. This step includes that: the secondary base station 1 transmits a first response message to the primary base station, where the first response message carries NG interface downlink tunnel endpoint information of the PDU Session 1 on the secondary base station 1 side, Xn interface data forwarding tunnel endpoint information based on the DRB 4 on the secondary base station 1 side, and re-mapping information on the secondary base station 1 side (i.e., the QoS flow 2 is re-mapped to the DRB 4); and the secondary base station 2 transmits a second response message to the primary base station, where the second response message carries NG interface downlink tunnel endpoint information of the PDU Session 1 on the secondary base station 2 side (including downlink tunnel endpoints a and b, where the downlink tunnel endpoint a is associated with the QoS flow 3, and the downlink tunnel endpoint b is associated with the QoS flow 4), Xn interface data forwarding tunnel endpoint information based on the DRB 2 and the mapped QoS flow 3 identifier on the secondary base station 2 side, and Xn interface data forwarding tunnel endpoint information based on the DRB 3 and the mapped QoS flow 4 identifier on the secondary base station 2 side.

In step 803, after receiving the response messages of the secondary base station 1 and the secondary base station 2, the primary base station transmits an indication message to the core network. This step includes that: after receiving the first response message and the second response message indicating acceptance of splitting of the secondary base station 1 and the secondary base station 2, the primary base station transmits an indication message to the core network. The indication message carries information of PDU Sessions to be split to the secondary base stations, and the PDU Session information includes a PDU Session 1 identifier, NG interface downlink tunnel endpoint information on the secondary base station 1 side and the corresponding QoS flow 2 identifier, NG interface downlink tunnel endpoint a information on the secondary base station 2 side and the corresponding QoS flow 3 identifier, and downlink tunnel endpoint b information and the corresponding QoS flow 4 identifier.

In step 804, the core network splits data according to the indication message. This step includes that: according to the information in the indication message, one piece of NG interface downlink tunnel endpoint information on the secondary base station 1 side and two pieces of NG interface downlink tunnel endpoint information on the secondary base station 2 side are added in the NG interface downlink tunnel endpoint information of the PDU Session 1, a subsequent data packet of the QoS flow 2 is transmitted to the NG interface downlink tunnel endpoint on the secondary base station 1 side, a subsequent data packet of the QoS flow 3 is transmitted to the NG interface downlink tunnel endpoint a on the secondary base station 2 side, and a subsequent data packet of the QoS flow 4 is transmitted to the NG interface downlink tunnel endpoint b on the secondary base station 2 side.

In step 805, the core network transmits an acknowledgement message to the primary base station.

In step 806, the primary base station performs data forwarding based on the Xn interface. This step includes that: the primary base station performs the Xn interface data forwarding based on the DRB, including that: the primary base station transmits the data packet from the QoS flow 2 to the Xn interface data forwarding tunnel based on the DRB 4, transmits the data packet from the QoS flow 3 to the Xn interface data forwarding tunnel based on the DRB 2, and transmits the data packet from the QoS flow 4 to the Xn interface data forwarding tunnel based on the DRB 3.

It should be understood by those skilled in the art that all or some steps in the methods described above may be implemented by relevant hardware (such as a processor) as instructed by programs, and the programs may be stored in a computer-readable storage medium, such as a read-only memory, a magnetic disk, an optical disk or the like. Optionally, all or some steps in the embodiments described above may also be implemented by using one or more integrated circuits. Accordingly, each module/unit in the embodiments described above may be implemented by hardware, for example, the functions of these modules/units may be implemented by integrated circuits; or may be implemented by software function modules, for example, the functions of these modules/units may be implemented by using a processor to execute programs/instructions stored in a storage medium. The present application is not limited to any specific combination of hardware and software.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

INDUSTRIAL APPLICABILITY

Through the present application, a first network device transmits a request message to a second network device; the second network device feeds a response message back to the first network device according to the request message received from the first network device; the first network device receives the response message fed back by the second network device and transmits an indication message to a third network device; and the third network device receives the indication message transmitted by the first network device, so as to process data according to the indication message. The present application implements data splitting and handover processing for a next-generation mobile communication technology.

What is claimed is:
1. A communication method, comprising:
transmitting, by a first network device to a second network device, a first message comprising first information of a protocol data unit (PDU) session; and
receiving, by the first network device in response to the second network device receiving the first message, a second message comprising second information of the PDU session indicating acceptance of a splitting of the PDU session by the second network device;
transmitting, by the first network device to a core network, in response to the second message, a third message comprising third information of the PDU session, the third information indicating the splitting of the PDU session;
wherein the first information of the PDU session comprises a PDU session identifier of the PDU session, next generation (NG) interface uplink tunnel endpoint information associated with the PDU session, and Quality of Service (QoS) flow information associated with the PDU session,
wherein the first information of the PDU session further comprises data radio bearer (DRB) information of a DRB associated with the PDU session, the DRB information comprising a DRB identifier (ID) of the DRB, and at least one QoS flow identifier mapped to the DRB, and
wherein the third information of the PDU session comprises a PDU session identifier of the PDU session and NG interface downlink tunnel endpoint information, and wherein the third message further comprises one or more QoS flow identifiers corresponding to NG interface downlink tunnel endpoint information.

2. The communication method of claim 1, wherein the first network device is a primary base station and the second network device is a secondary base station.

3. A first network device, comprising:
- a transmitter configured to transmit a first message to a second network device, the first message comprising first information of a first protocol data unit (PDU) session; and
- a receiver configured to receive, in response to the second network device receiving the first message, a second message comprising second information of the PDU session indicating acceptance of a splitting of the PDU session by the second network device,
- wherein the transmitter is configured to transmit, to a core network, in response to the second message, a third message comprising third information of the PDU session, the third information indicating the splitting of the PDU session;
- wherein the first information of the PDU session comprises a PDU session identifier of the PDU session, next generation (NG) interface uplink tunnel endpoint information associated with the PDU session, and Quality of Service (QoS) flow information associated with the PDU session,
- wherein the first information of the PDU session further comprises data radio bearer (DRB) information of a DRB associated with the PDU session, the DRB information comprising a DRB identifier (ID) of the DRB, and at least one QoS flow identifier mapped to the DRB, and
- wherein the third information of the PDU session comprises a PDU session identifier of the PDU session and NG interface downlink tunnel endpoint information, and wherein the third message further comprises one or more QoS flow identifiers corresponding to NG interface downlink tunnel endpoint information.

4. The first network device of claim 3, wherein the first network device is a primary base station and the second network device is a secondary base station.

5. A communication method, comprising:
- receiving, by a second network device, a first message transmitted by a first network device, the first message comprising first information of a protocol data unit (PDU) session; and
- transmitting, by the second network device to the first network device in response to receiving the first message, a second message comprising second information of the PDU session indicating acceptance of a splitting of the PDU session by the second network device,
- causing, by the second network device, the first network device to transmit to a core network, in response to the second message, a third message comprising third information of the PDU session, the third information indicating the splitting of the PDU session;
- wherein the first information of the PDU session comprises a PDU session identifier of the PDU session, next generation (NG) interface uplink tunnel endpoint information associated with the PDU session, and Quality of Service (QoS) flow information associated with the PDU session,
- wherein the first information of the PDU session further comprises: data radio bearer (DRB) information of a DRB associated with the PDU session, the DRB information comprising a DRB identifier (ID) of the DRB, and at least one QoS flow identifier mapped to the DRB, and
- wherein the third information of the PDU session comprises a PDU session identifier of the PDU session and NG interface downlink tunnel endpoint information, and wherein the third message further comprises one or more QoS flow identifiers corresponding to NG interface downlink tunnel endpoint information.

6. A second network device, comprising:
- a receiver configured to receive a first message transmitted by a first network device to a second network device, the first message comprising first information of a protocol data unit (PDU) session; and
- a transmitter configured to:
  - transmit a second message comprising second information of the PDU session indicating acceptance of a splitting of the PDU session by the second network device in response to receiving the first message,
  - cause the first network device to transmit, to a core network, in response to the second message, a third message comprising third information of the PDU session, the third information indicating the splitting of the PDU session;
- wherein the first PDU session information comprises a PDU session identifier of a first PDU session, next generation (NG) interface uplink tunnel endpoint information associated with the first PDU session, and Quality of Service (QoS) flow information associated with the first PDU session,
- wherein the first PDU session information further comprises data radio bearer (DRB) information of a DRB associated with the first PDU session, the DRB information comprising a DRB identifier (ID) of the DRB, and at least one QoS flow identifier mapped to the DRB, and
- wherein the third information of the PDU session comprises a PDU session identifier of the PDU session and NG interface downlink tunnel endpoint information, and wherein the third message further comprises one or more QoS flow identifiers corresponding to NG interface downlink tunnel endpoint information.

* * * * *